(12) United States Patent
Shen et al.

(10) Patent No.: US 12,452,000 B2
(45) Date of Patent: Oct. 21, 2025

(54) METHOD FOR DETERMINING PUCCH REPETITION FACTOR, AND UE AND BASE STATION

(71) Applicant: DATANG MOBILE COMMUNICATIONS EQUIPMENT CO., LTD., Beijing (CN)

(72) Inventors: Shuling Shen, Beijing (CN); Lei Wang, Beijing (CN); Xuejuan Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 344 days.

(21) Appl. No.: 18/031,872

(22) PCT Filed: Sep. 28, 2021

(86) PCT No.: PCT/CN2021/121182
§ 371 (c)(1),
(2) Date: Apr. 13, 2023

(87) PCT Pub. No.: WO2022/078204
PCT Pub. Date: Apr. 21, 2022

(65) Prior Publication Data
US 2023/0388061 A1    Nov. 30, 2023

(30) Foreign Application Priority Data
Oct. 16, 2020   (CN) .......................... 202011110724.3

(51) Int. Cl.
*H04W 72/00* (2023.01)
*H04L 1/1812* (2023.01)
(Continued)

(52) U.S. Cl.
CPC .......... *H04L 1/1819* (2013.01); *H04L 1/1822* (2013.01); *H04L 5/0053* (2013.01); *H04W 72/20* (2023.01)

(58) Field of Classification Search
None
See application file for complete search history.

(56) References Cited

U.S. PATENT DOCUMENTS

| | | | |
|---|---|---|---|
| 2019/0029009 A1 | 1/2019 | Freda et al. | |
| 2019/0182824 A1 | 6/2019 | Chatterjee | |

(Continued)

FOREIGN PATENT DOCUMENTS

| | | | |
|---|---|---|---|
| CN | 110536450 A | 12/2019 | |
| CN | 111567123 A | 8/2020 | |

OTHER PUBLICATIONS

European Patent Office, Extended European Search Report Issued in Application No. 21879250.5, Jul. 24, 2024, Germany, 9 pages.

(Continued)

*Primary Examiner* — Brandon M Renner
(74) *Attorney, Agent, or Firm* — KILPATRICK TOWNSEND & STOCKTON LLP

(57) ABSTRACT

Embodiments of the present application provide a method for determining a physical uplink control channel (PUCCH) repetition factor, and a user equipment (UE) and base station, comprising: determining a PUCCH repetition factor according to received target information; said target information comprises first information or second information, said first information comprises a PUCCH resource indicator (PRI) field in downlink control information (DCI), said second information comprises control information carried by the DCI, a media access control control element (MAC CE), or a group common physical downlink control channel (PDCCH). The embodiments of the present application (Continued)

enable a dynamic indication process of the PUCCH repetition factor.

16 Claims, 2 Drawing Sheets

(51) Int. Cl.
    *H04L 1/1822*     (2023.01)
    *H04L 5/00*     (2006.01)
    *H04W 72/20*     (2023.01)

(56) References Cited

U.S. PATENT DOCUMENTS

| | | |
|---|---|---|
| 2020/0205150 A1 | 6/2020 | Cheng et al. |
| 2020/0228248 A1* | 7/2020 | Islam .................... H04L 5/0055 |
| 2020/0259625 A1* | 8/2020 | Papasakellariou ... H04B 7/0456 |
| 2022/0038218 A1* | 2/2022 | Kim ...................... H04L 1/1854 |
| 2022/0095346 A1* | 3/2022 | Khoshnevisan ...... H04L 1/1896 |
| 2023/0037290 A1* | 2/2023 | Taherzadeh Boroujeni ................ H04W 72/0446 |
| 2023/0421233 A1* | 12/2023 | Li .......................... H04B 7/024 |

OTHER PUBLICATIONS

3GPP Technical Specification, 3rd Generation Partnership Project; Technical Specification Group Radio Access Network; NR; Physical layer procedures for control(Release 16), 3GPP TS 38.213 version 16.3.0, total 181 pages.

State Intellectual Property Office of the People's Republic of China, First Office Action Issued in related Application No. 202011110724. 3, Apr. 29, 2023, 8 pages.

Patent Office of Taiwan, First Office Action Issued in related Application No. 110136134, Mar. 9, 2023, 10 pages.

Ericsson, "HARQ-ACK Enhancements for IIoT/URLLC", 3GPP TSG-RAN WG1 Meeting #102-e, e-Meeting, Aug. 17-28, 2020, total 7 pages, R1-2005513.

ZTE, "Multi-TRP enhancements for PDCCH, PUCCH and PUSCH", 3GPP TSG RAN WG1 Meeting #102-e, e-Meeting, Aug. 17-28, 2020, total 12 pages, R1-2005455.

* cited by examiner

101

Determining a PUCCH repetition factor based on received target information

201

Transmitting target information to a user equipment (UE), where the target information is used for determining a PUCCH repetition factor by the UE

| CC #1 value=01 | CC #2 value=00 | ...... | CC #n value=01 |

| UE #1 value=10 | UE #2 value=11 | ...... | UE #n value=01 |

METHOD FOR DETERMINING PUCCH REPETITION FACTOR, AND UE AND BASE STATION

CROSS-REFERENCE TO RELATED APPLICATION

The present application is a National Stage of International Application No. PCT/CN2021/121182, filed on Sep. 28, 2021, which claims priority to Chinese patent application No. 2020111107243 filed on Oct. 16, 2020, entitled "Method for Determining PUCCH Repetition Factor, and UE and Base Station", which is hereby incorporated by reference in its entirety.

FIELD

The present application relates to the field of communication, and in particular, to methods for determining a physical uplink control channel (PUCCH) repetition factor, user equipment (UE) and a base station.

BACKGROUND

In case that a length of a path for a physical uplink control channel (PUCCH) transmission is insufficient, larger uplink coverage area and better transmission performance can be achieved through repeated transmission. In 5G new radio (NR), a PUCCH repetition factor is configured through radio resource control (RRC) based on large-scale properties of propagation conditions. In order to ensure the reliability of PUCCH transmission, the RRC generally configures a less repetition factor. However, a semi-statically configured repetition factor fails to well adapt to instantaneously changing radio channel conditions, especially when channel conditions are good, a larger repetition factor reduces a spectral utilization rate, which is not conducive to carrying more coverage limited user equipment (UE). It is desirable to make the UE be able to respond the changes of channel conditions without a RRC signaling by dynamically indicting the PUCCH repetition factor.

SUMMARY

Embodiments of the present application provide methods for determining a physical uplink control channel (PUCCH) repetition factor, user equipment (UE), and a base station which solves the problem that a PUCCH repetition factor cannot be dynamically adjusted.

An embodiment of the present application provides a method for determining a physical uplink control channel (PUCCH) repetition factor, including:
determining a PUCCH repetition factor based on received target information;
where the target information includes first information or second information, the first information includes a PUCCH resource indication (PRI) field in downlink control information (DCI), and the second information includes DCI, a medium access control layer control element (MAC CE) or control information carried by a group common physical downlink control channel (PDCCH).

An embodiment of the present application provides a method for determining a physical uplink control channel (PUCCH) repetition factor, including:
transmitting target information to user equipment (UE), where the target information is used for enabling the UE to determine a PUCCH repetition factor;
where the target information includes first information or second information, the first information includes a PUCCH resource indication (PRI) field in downlink control information (DCI), and the second information includes DCI, a medium access control layer control element (MAC CE) or control information carried by a group common physical downlink control channel (PDCCH).

An embodiment of the present application provides a device for determining a physical uplink control channel (PUCCH) repetition factor, including:
a determining device, used for determining a PUCCH repetition factor based on received target information;
where the target information includes first information or second information, the first information includes a PUCCH resource indication (PRI) field in downlink control information (DCI), and the second information includes DCI, a medium access control layer control element (MAC CE) or control information carried by a group common physical downlink control channel (PDCCH).

An embodiment of the present application provides a device for determining a physical uplink control channel (PUCCH) repetition factor, including:
a transmitting device, used for transmitting target information to user equipment (UE), where the target information is used for enabling the UE to determine a PUCCH repetition factor;
where the target information includes first information or second information, the first information includes a PUCCH resource indication (PRI) field in downlink control information (DCI), and the second information includes DCI, a medium access control layer control element (MAC CE) or control information carried by a group common physical downlink control channel (PDCCH).

An embodiment of the present application provides a user equipment (UE), including:
a processor,
a memory storing a computer program, and
a transceiver transmitting and receiving data under a control of the processor;
the computer program, when executed by the processor, causes the processor to perform the following operations of:
determining a PUCCH repetition factor based on received target information;
where the target information includes first information or second information, the first information includes a PUCCH resource indication (PRI) field in downlink control information (DCI), and the second information includes DCI, a medium access control layer control element (MAC CE) or control information carried by a group common physical downlink control channel (PDCCH).

An embodiment of the present application provides a base station, including:
a processor,
a memory storing a computer program, and
a transceiver transmitting and receiving data under a control of the processor;
the computer program, when executed by the processor, causes the processor to perform the following operations of:

transmitting target information to user equipment (UE), where the target information is used for enabling the UE to determine a physical uplink control channel (PUCCH) repetition factor;

where the target information includes first information or second information, the first information includes a PUCCH resource indication (PRI) field in downlink control information (DCI), and the second information includes DCI, a medium access control layer control element (MAC CE) or control information carried by a group common physical downlink control channel (PDCCH).

An embodiment of the present application further provides a non-transitory computer readable storage medium having stored thereon a computer program that cause a processor to perform methods for determining a PUCCH repetition factor described above.

In the methods for determining the PUCCH repetition factor, the UE and the base station, the PUCCH repetition factor can be dynamically indicated by determining the PUCCH repetition factor based on received target information; where the target information includes first information or second information, the first information includes a PRI field in DCI, and the second information includes DCI, a MAC CE or control information carried by a group common PDCCH, and thus the internet side can flexibly adjust the PUCCH repetition factor as the changes of the state of radio channels and the spectral utilization rate of a system is improved on the premise of satisfying the PUCCH coverage requirements.

BRIEF DESCRIPTION OF THE DRAWINGS

In order to more clearly illustrate the embodiments of the present application, the accompanying drawings used in the descriptions of the embodiments are briefly described below. The drawings in the following description are only some embodiments of the present application, and other drawings can be obtained according to the drawings.

DETAILED DESCRIPTION

Figures 1, 2, 3, 4, 5:
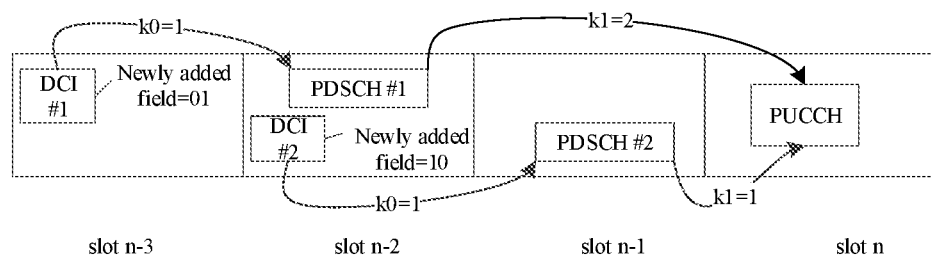
FIG. 1 is a schematic flowchart showing steps of a method for determining a physical downlink control channel (PUCCH) repetition factor applied to user equipment (UE) according to an embodiment of the present application.
FIG. 2 is a schematic flowchart showing steps of a method for determining a PUCCH repetition factor applied to a base station according to an embodiment of the present application.
FIG. 3 is a schematic diagram showing that multiple downlink control information (DCI) correspond to the same PUCCH resource according to a third embodiment of the present application.
FIG. 4 is a first schematic structural diagram of a group common physical downlink control channel (PDCCH) according to a sixth embodiment of the present application.
FIG. 5 is a second schematic structural diagram of a group common PDCCH according to the sixth embodiment of the present application.

The solutions in the embodiments of the present application are described in the following with reference to the accompanying drawings in the embodiments of the present application. These embodiments are only some embodiments of the present application, and not all embodiments.

In 5G new radio (NR), a physical uplink control channel (PUCCH) repetition factor is semi-statically configured by a higher layer signaling. For transmission of semi-statically configured uplink control information (UCI), including channel situation information (CSI), a scheduling request (SR) and hybrid automatic repeat request-acknowledge (HARQ-ACK) for a semi-persistent scheduling physical downlink shared channel (SPS PDSCH), etc., a base station (gNB) semi-statically configures PUCCH resource through the higher layer signaling, where the PUCCH repetition factor is fixed. The PUCCH resource for a semi-static signal can be obtained only by the RRC configuration, and the semi-statically configured PUCCH repetition factor of the PUCCH resource cannot be adjusted as the changes of radio channel conditions, and the reduction of a spectral efficiency is not conducive to carrying more coverage limited UE.

For a dynamically scheduled HARQ-ACK feedback, which is an HARQ-ACK with a PDSCH scheduled by a physical downlink control channel (PDCCH) or an HARQ-ACK for a PDCCH indicating a release of an SPS resource, the UE first determines a PUCCH resource set based on UCI bits to be transmitted, a resource set containing multiple PUCCH resources, and then determines a given PUCCH resource for transmission from the PUCCH resource set through a PUCCH resource indication (PRI) field in downlink control information (DCI) signaling. The higher layer signaling configures a resource number, PUCCH format indication, etc., for each PUCCH resource, including exclusive parameters required by different PUCCH formats, such as a starting orthogonal frequency division multiplexing (OFDM) symbol index startingSymbolIndex and the number of OFDM symbols nrofSymbols occupied by PUCCH. However, some parameters such as a target coding rate and a repetition factor are not individually configured for each PUCCH resource, but are parameters shared by all PUCCH resources in a given PUCCH format. In the traditional art, a PUCCH repetition factor is bound to the PUCCH format, that is, in all PUCCH resources configured with the same PUCCH format, the PUCCH repetition factor is the same. Transmissions with different repetition factors can only be performed by using PUCCH resources configured with different PUCCH formats, which results in that for dynamically scheduled HARQ-ACK, although resources with an appropriate PUCCH format can be selected through PRI to select the bundled repetition factors, it fails to perform different numbers of repetitions for transmission through the same PUCCH format to satisfy channel coverage requirements.

Embodiments of the present application provide methods for determining a physical uplink control channel (PUCCH) repetition factor, user equipment (UE), and a base station which solves the problem that the PUCCH repetition factor cannot be dynamically adjusted.

The methods and the devices according to the present application are based on the same conception. The implementation of the devices and the methods can be referred to each other since the principles of the methods and the devices are similar, and the similar part is not repeated.

The solutions according to the embodiments of the present application can be applicable to various systems, for example, 5G systems. For example, the applicable systems can be a global system of mobile communication (GSM) system, a code division multiple access (CDMA) system, a wideband code division multiple access (WCDMA) general packet radio service (GPRS) system, a long term evolution (LTE) system, an LTE frequency division duplex (FDD) system, an LTE time division duplex (TDD) system, a long term evolution advanced (LTE-A) system, a universal mobile telecommunication system (UMTS), a worldwide interoperability for microwave access (WiMAX) system, a 5G new radio (NR) system, etc. These various systems include a terminal and a base station, and can further include a core network part, such as an evolved packet system (EPS), a 5G system (5GS), and the like.

The terminal in the embodiments of the present application can be a device that provides voice and/or data connectivity to a user, a handheld device with a wireless connection function, or other processing devices connected to a wireless modem. In different systems, the names of the terminal may be different. For example, in the 5G system, the terminal may be called as user equipment (UE). A wireless terminal can communicate with one or more core networks (CNs) via a radio access network (RAN), and the wireless terminal can be a mobile terminal, such as a mobile phone (or cellular phone) and a computer with mobile terminal, e.g., a portable mobile device, a pocket-sized mobile device, a handheld mobile device, a computer-built mobile device or a vehicle-mounted mobile device, which exchange language and/or data with the radio access network. For example, a personal communication service (PCS) phone, a radio phone, a session initiated protocol (SIP) phone, a wireless local loop (WLL) station, a personal digital assistant (PDA) and other devices. A wireless terminal side device may also be called a system, a subscriber device, a subscriber station, a mobile station, a mobile, a remote station, an access point, a remote terminal, an access terminal, a user terminal, a user agent, or a user device, which is not limited in the embodiments of the present application. Since the terminal side device and other network side devices (such as a core network side device, an access network side device (i.e. a base station)) together form a network being able to support communication, the terminal side device can be regarded as a network side device in the present application.

The network side device in the embodiments of the present application can be a base station, and the base station can include multiple cells providing services for the terminal. Depending on the specific scenario, the base station may be called an access point, or a device communicating with a wireless terminal through one or more sectors on the air interface in the access network, or other names. The network side device can be used for exchanging received air frames with internet protocol (IP) packets, and acting as a router between the wireless terminal and the rest of the access network, where the rest of the access network can include an IP communication network. The network side devices can also coordinate attribute management for the air interface. For example, the network side device in the embodiments of the present application may be a base transceiver station (BTS) in a global system for mobile communications (GSM) or a code division multiple access (CDMA), a node B in a wide-band code division multiple access (WCDMA), an evolutional node B (eNB or e-Node B) in a long term evolution (LTE) system, a 5G base station (gNB) in 5G network architecture (next generation system), a home evolved node B (HeNB), a relay node, a femto, or a pico base station (pico), etc., which is not limited in the embodiments of the present application. In some network structures, the network side device may include a centralized unit (CU) node and a distributed unit (DU) node, and the centralized unit and the distributed unit may be geographically separated.

Furthermore, it should be noted that "one embodiment" or "an embodiment" throughout the specification of the present application means that a particular feature, structure, or characteristic associated with the embodiment is included in one or more embodiments of the present application. Thus, "in one embodiment" or "in an embodiment" throughout this specification does not necessarily refer to the same embodiment, and the particular features, structures or characteristics can be combined in any suitable manner in one or more embodiments.

The present application is described below in detail.

FIG. 1 is a schematic flowchart showing steps of a method for determining a physical downlink control channel (PUCCH) repetition factor applied to user equipment (UE) according to an embodiment of the present application. The method includes the following steps:

step 101, determining a PUCCH repetition factor based on received target information.

The target information includes first information or second information, the first information includes a PUCCH resource indication (PRI) field in downlink control information (DCI), and the second information includes a given field in DCI, a medium access control layer control element (MAC CE) or control information carried by a group common physical downlink control channel (PDCCH). For example, the given field may be a newly added field.

For example, the UE can determine a PUCCH repetition factor based on the PRI field in received DCI, or determine a PUCCH repetition factor based on the received DCI, or determine a PUCCH repetition factor based on received MAC CE, or determine a PUCCH repetition factor based on received group common PDCCH.

Compared with the traditional art in which the UE determines a PUCCH resource set based on UCI bits to be transmitted, and then can only determine a given PUCCH resource from the PUCCH resource set by using the PRI field in DCI signaling to obtain the PUCCH repetition factor semi-statically configured by the higher layer signaling, the PRI field of the embodiments of the present application can not only indicate to determine the given PUCCH resource to obtain the semi-static PUCCH repetition factor, but also directly and dynamically indicate the PUCCH repetition factor, which solves the problem that it is impossible to dynamically indicate the PUCCH repetition factor as radio channel conditions change in traditional art, and then the repetition factor of PUCCH in any format can be dynamically indicated through the PRI field, and different numbers of repetitions for transmission can be performed through the same PUCCH format.

In addition, the PUCCH repetition factor or the related content of the PUCCH repetition factor is directly indicated through DCI signaling, MAC CE or group common PDCCH to dynamically configure the PUCCH repetition factor and then satisfy the channel coverage requirements.

By determining the PUCCH repetition factor based on the received target information by the UE in the present embodiment, dynamic indication of the PUCCH repetition factor is implemented, which solves both the problem that the PUCCH repetition factor cannot be adjusted in case that PUCCH resources for the semi-static signal are obtained through RRC configuration and the problem that the PUCCH repetition factor cannot be arbitrarily selected in case that the PUCCH repetition factor and the PUCCH format are bound in traditional art.

In the present embodiment, in case that the target information is the PRI field in DCI, the PUCCH repetition factor can be determined based on received target information by the following schemes.

In scheme 1, a first PUCCH resource for a dynamically scheduled HARQ-ACK feedback is determined based on a status value of the PRI field in the DCI, and a repetition factor of a first PUCCH corresponding to the first PUCCH resource is determined based on received higher layer signaling.

The dynamically scheduled HARQ-ACK feedback is an HARQ-ACK with a PDSCH scheduled by a PDCCH or an HARQ-ACK for a PDCCH indicating a release of an SPS resource.

In the scheme 1, a repetition factor of a PUCCH corresponding to each PUCCH resource can be configured through the higher layer signaling. For example, in this scheme, the UE can receive the higher layer signaling transmitted by the base station, where the higher layer signaling is configured with a repetition factor of a first PUCCH corresponding to the first PUCCH resource and the first PUCCH is a PUCCH carrying the dynamically scheduled HARQ-ACK feedback.

In an embodiment, the higher layer signaling may be RRC signaling.

For the dynamically scheduled HARQ-ACK feedback, after determining a PUCCH resource set based on the UCI bits to be transmitted, and determining the first PUCCH resource for the dynamically scheduled HARQ-ACK feedback from the resource set based on the status value of the PRI field in the DCI, the UE can determine the repetition factor of the first PUCCH corresponding to the first PUCCH resource based on the received higher layer signaling, and then repeat the transmission of the PUCCH carrying the dynamically scheduled HARQ-ACK feedback based on the repetition factor of the first PUCCH.

In this way, it enables to configure a repetition factor of a PUCCH corresponding to each PUCCH resource through the higher layer signaling. Compared with the manner of bundling the PUCCH repetition factor and the PUCCH format in traditional art, different numbers of repetitions for transmission can be performed through the same PUCCH format to satisfy channel coverage requirements, and the PUCCH repetition factor is dynamically adjusted.

In scheme 2, a second PUCCH resource for a dynamically scheduled HARQ-ACK feedback is determined based on a status value of the PRI field in the DCI, and repetition factor of a second PUCCH corresponding to the second PUCCH resource is determined based on a pre-obtained correspondence between the status values of the PRI field and the PUCCH repetition factors, where the second PUCCH is a PUCCH carrying the dynamically scheduled HARQ-ACK feedback.

In the scheme 2, the correspondence between the status values of the PRI field and the PUCCH repetition factors can be pre-configured, where each status value of the PRI field corresponds to a PUCCH repetition factor. For example, the correspondence is shown in Table 1 below.

TABLE 1

| PRI | PUCCH resource | Repetition factor |
|-----|---------------|-------------------|
| '000' | PUCCH resource #1 | 4 |
| '001' | PUCCH resource #2 | 2 |
| '010' | PUCCH resource #3 | 4 |
| '011' | PUCCH resource #4 | 8 |
| '100' | PUCCH resource #5 | 2 |
| '101' | PUCCH resource #6 | 8 |
| '110' | PUCCH resource #7 | 2 |
| '111' | PUCCH resource #8 | 4 |

As shown in the table 1, since the status values of PRI field can be used for determining the second PUCCH resource for the dynamically scheduled HARQ-ACK feedback, the correspondence between each PUCCH resource and the PUCCH repetition factor can be determined through status values of PRI field by configuring the correspondence between the status values of PRI field and the PUCCH repetition factors, and then the repetition factor of the second PUCCH corresponding to the second PUCCH resource can be determined in this manner.

One PUCCH repetition factor is configured for each status value of the PRI field, and a PUCCH resource can be determined based on each status value of the PRI field, and then it is achieved that a repetition factor is configured for a corresponding PUCCH of each PUCCH resource and thus the PUCCH repetition factor is implicitly determined through the PRI. Compared with the manner of bundling the PUCCH repetition factor and the PUCCH format in traditional art, different numbers of repetitions for transmission are performed through the same PUCCH format to satisfy channel coverage requirements, and then the PUCCH repetition factor is dynamically adjusted.

The correspondence between the status values of PRI field and PUCCH repetition factors may be pre-agreed by the UE and the base station through a protocol; or, the correspondence between the status values of PRI field and the PUCCH repetition factors may be pre-configured through target signaling, where the target signaling includes higher layer signaling, MAC CE or physical layer signaling.

In an embodiment, in case that the target information is DCI, for the PUCCH carrying the dynamically scheduled HARQ-ACK feedback, the PUCCH repetition factor can be determined explicitly through a newly added field in the DCI. This is explained below.

A newly added field is included in the DCI, and the newly added field includes N bits or M bits. Each of the $2^N$ status values composed of the N bits corresponds to a PUCCH repetition factor, and each of the $2^M$ status values composed of the M bits corresponds to a scaling factor value.

In an embodiment, the determining the PUCCH repetition factor based on the received target information can includes: determining a third PUCCH resource for the dynamically scheduled HARQ-ACK feedback based on a status value of the PRI field in the DCI, and in case that the newly added field in the DCI includes N bits,
  determining a PUCCH repetition factor corresponding to the newly added field as a repetition factor of a third PUCCH corresponding to the third PUCCH resource, where the third PUCCH is a PUCCH carrying the dynamically scheduled HARQ-ACK feedback; and in case that the newly added field includes M bits, scaling a semi-static PUCCH repetition factor configured by the RRC based on the scaling factor value corresponding to the newly added field to obtain the repetition factor of the third PUCCH.

Both N and M are integers greater than or equal to 0, and the scaling factor value is a number greater than or equal to 0. For example, the scaling factor value can be a decimal between 0 and 1 to scale the semi-static PUCCH repetition factor configured by the RRC, or the scaling factor value can be a number greater than 1 to enlarge the semi-static PUCCH repetition factor configured by the RRC.

By configuring the newly added field including N bits or M bits, and configuring the correspondence between different status values composed of the bits of the newly added field and the PUCCH repetition factors, or configuring the correspondence between different status values composed of the bits of the newly added field and scaling factor values, the repetition factor of the third PUCCH corresponding to the third PUCCH resource can be directly determined based on the obtained status values of the newly added field in the DCI in case that the number of bits of the newly added field in the DCI is N. In one embodiment, the scaling factor values can be determined based on the acquired status values of the newly added field in the DCI in case that the number of bits of the newly added field in the DCI is M, and then the repetition factor of the third PUCCH can be obtained by scaling the configured PUCCH repetition factor. The repetition factor of the third PUCCH corresponding to the third PUCCH resource can be simultaneously determined based on the newly added field in the DCI while the third PUCCH resource is determined based on the status values of the PRI field in the DCI and thus the procedure of dynamically determining the PUCCH repetition factor is implemented.

In case that the third PUCCH resource for the dynamically scheduled HARQ-ACK feedback corresponds to multiple DCI, the repetition factor of the third PUCCH corresponding to the third PUCCH resource is determined by any of the following ways.

In way 1, in case that the third PUCCH resource corresponds to multiple DCI, the repetition factors of the third PUCCH determined based on the newly added field in each of the multiple DCI are the same.

For example, the status values of the newly added fields in multiple DCI corresponding to the third PUCCH resource received by the UE are the same.

In way 2, in case that the third PUCCH resource corresponds to multiple DCI and the repetition factors of the third PUCCH determined based on the newly added field in each DCI are different, the repetition factor of the third PUCCH is determined based on the lastly received DCI, or a maximum value, or a minimum value or an average value among the PUCCH repetition factor determined based on all the multiple DCI is determined as the repetition factor of the third PUCCH.

In the way 2, in case that the third PUCCH resource corresponds to multiple DCI, the repetition factor of the third PUCCH determined based on the newly added field in each DCI may be different. The repetition factor of the third PUCCH can be determined based on the lastly received DCI, or the repetition factor of the third PUCCH is a maximum value, or a minimum value or an average value among the PUCCH repetition factors determined based on all the DCI.

By limiting the determination ways of the repetition factor of the third PUCCH in case that the third PUCCH resource corresponds to multiple DCI, a situation that the determined repetition factors of the third PUCCH are inconsistent in case that there are multiple DCI corresponding to the third PUCCH resource is avoided.

In an embodiment, in case that there is a semi-static UCI such as CSI, SR, and HARQ-ACK for SPS PDSCH, for the semi-static UCI, a fourth PUCCH resource configured through higher layer signaling can be obtained, and a repetition factor of a fourth PUCCH corresponding to the fourth PUCCH resource is determined based on a PUCCH resource for a dynamically scheduled HARQ-ACK feedback.

The fourth PUCCH is a PUCCH carrying the semi-static UCI, and the PUCCH resource for the dynamically scheduled HARQ-ACK feedback can be the second PUCCH resource or the third PUCCH resource in the foregoing embodiment.

In an embodiment, the repetition factor of the fourth PUCCH corresponding to the fourth PUCCH resource is determined based on the PUCCH resource for the dynamically scheduled HARQ-ACK feedback by the following schemes.

In scheme 1, a first target PUCCH resource having the same resource number as the fourth PUCCH resource is selected from PUCCH resources for the dynamically scheduled HARQ-ACK feedback, and the repetition factor of the fourth PUCCH is determined based on a repetition factor of a first target PUCCH corresponding to the first target PUCCH resource.

The fourth PUCCH resource configured by the RRC for the semi-static UCI and some resources in the PUCCH resources for the dynamically scheduled HARQ-ACK feedback have the same resource numbers.

The first target PUCCH resource having the same resource number as the fourth PUCCH resource can be selected from the PUCCH resources for the dynamically scheduled HARQ-ACK feedback, and the repetition factor of the fourth PUCCH is then determined based on repetition factors corresponding to the first target PUCCH resource having the same resource number as the fourth PUCCH resource.

For example, the repetition factor of the first target PUCCH corresponding to the first target PUCCH resource can be determined as the repetition factor of the fourth PUCCH.

In scheme 2, in case that the semi-static UCI is CSI, a second target PUCCH resource having the same coding rate as the fourth PUCCH resource is selected from PUCCH resources for the dynamically scheduled HARQ-ACK feedback, and the repetition factor of the fourth PUCCH is determined based on a repetition factor of a second target PUCCH corresponding to the second target PUCCH resource.

In the scheme 2, in case that the semi-static UCI is CSI, the UE can select the second target PUCCH resource for the dynamically scheduled HARQ-ACK feedback having the same coding rate as the fourth PUCCH resource based on the coding rate of the fourth PUCCH resource configured by the RRC and determine the repetition factor of the fourth PUCCH based on repetition factors corresponding to the selected second target PUCCH resource, where the fourth PUCCH carries the CSI.

For example, the repetition factor of the second target PUCCH corresponding to the second target PUCCH resource can be determined as the repetition factor of the fourth PUCCH.

In scheme 3, in case that the semi-static UCI is SR, a third target PUCCH resource having the same PUCCH format and the number of symbols occupied by the PUCCH format as the fourth PUCCH resource is selected from PUCCH resources for the dynamically scheduled HARQ-ACK feedback, and the repetition factor of the fourth PUCCH is determined based on a repetition factor of a third target PUCCH corresponding to the third target PUCCH resource.

In the scheme 3, in case that the semi-static UCI is the SR, the UE can select the third target PUCCH resource for the dynamically scheduled HARQ-ACK feedback having the same configuration based on the PUCCH format and number of symbols occupied by the PUCCH format of the fourth PUCCH resources configured by the RRC and determine the repetition factor of the fourth PUCCH based on repetition factors corresponding to the selected third target PUCCH resource, where the fourth PUCCH carries the SR.

For example, the repetition factor of the third target PUCCH corresponding to the third target PUCCH resource can be determined as the repetition factor of the fourth PUCCH.

In scheme 4, in case that the semi-static UCI is the HARQ-ACK feedback corresponding to the SPS PDSCH, the repetition factor of the fourth PUCCH is determined based on PUCCH repetition factors corresponding to status values of the PRI field in the target DCI, where the target DCI is a DCI activating the SPS.

In the scheme 4, in case that the semi-static UCI is the HARQ-ACK feedback corresponding to the SPS PDSCH, the PUCCH repetition factor corresponding to the status values of the PRI field in the target DCI can be determined first based on the correspondence between the status values and the PUCCH repetition factors, and then the repetition factor of the fourth PUCCH can be determined based on the determined PUCCH repetition factor corresponding to status values of the PRI.

For example, the PUCCH repetition factor corresponding to the status values of the PRI field can be determined as the repetition factor of the fourth PUCCH.

The repetition factor of the fourth PUCCH carrying the semi-static UCI is determined through any of the above schemes 1 to 4, that is, a dynamic configuration procedure of the repetition factor of the PUCCH carrying the semi-static UCI is performed.

In case that the number of the above-mentioned target PUCCH resources is at least two, the maximum value, the minimum value or the average value among the repetition factors corresponding to all the target PUCCH resources can be determined as the repetition factor of the fourth PUCCH, where the target PUCCH resource is the first target PUCCH resource, the second target PUCCH resource or the third target PUCCH resource.

For example, in case that the number of the selected first target PUCCH resources is at least two, the maximum value, the minimum value or the average value among the repetition factors corresponding to all the first target PUCCH resources can be determined as the repetition factor of the fourth PUCCH; or in case that the number of the selected second target PUCCH resources is at least two, the maximum value, the minimum value or the average value of the repetition factors corresponding to all the second target PUCCH resources can be determined as the repetition factor of the fourth PUCCH; or in case that the number of the selected third target PUCCH resources is at least two, the maximum value, the minimum value or the average value of the repetition factors corresponding to all the third target PUCCH resources can be determined as the repetition factor of the fourth PUCCH.

In the present embodiment, in case that the target information is MAC CE, the PUCCH repetition factor can be determined based on received target information by the following scheme.

For a fifth PUCCH carrying UCI, the MAC CE transmitted by the base station can be received. The MAC CE includes one or more repetition factor indication fields, and each repetition factor indication field is used for indicating a repetition factor corresponding to a PUCCH resource or a group of PUCCH resources. In case that the MAC CE takes effect, the repetition factor of the fifth PUCCH is determined based on one or more repetition factor indication fields in the MAC CE.

In an embodiment, the time of taking effect of the MAC CE is time after the UE transmits the HARQ-ACK feedback to the base station after receiving the MAC CE and the base station receives the HARQ-ACK feedback.

In case that the MAC CE does not take effect, the repetition factor of the fifth PUCCH is a preset value or a repetition factor configured by the RRC.

In case that the UE determines the repetition factor of the fifth PUCCH based on one or more repetition factor indication fields in the MAC CE, the UE can obtain a repetition factor indication field corresponding to the PUCCH resources of the UE from the one or more repetition factor indication fields and then obtain the repetition factor of the fifth PUCCH.

For example, in case that a repetition factor indication field is used for indicating a repetition factor corresponding to a PUCCH resource, the resource number of the PUCCH resource can be in one-to-one correspondence with an index of the repetition factor indication field. The UE can obtain, from the MAC CE, the repetition factor indication field indicating the PUCCH resource corresponding to the fifth PUCCH based on the resource number of the PUCCH resource and obtain the repetition factor of the fifth PUCCH from the repetition factor indication field indicating the PUCCH resource. In case that one repetition factor indication field is used for indicating a repetition factor corresponding to one group of PUCCH resources, the number of the group of PUCCH resources corresponds to one index of the repetition factor indication field and the PUCCH resources need to be grouped. The PUCCH resources for the dynamically scheduled HARQ-ACK feedback can be grouped according to a PUCCH resource set, or can be further grouped in a PUCCH resource set. The PUCCH resources for the semi-static signal can be grouped separately or together with the PUCCH resources for the dynamically scheduled HARQ-ACK feedback. The grouping manner is not limited in the present application. The UE can obtain, from the MAC CE, the repetition factor indication field indicating the PUCCH resource corresponding to the fifth PUCCH based on a grouping number of the PUCCH resource and obtain the repetition factor of the fifth PUCCH from the repetition factor indication field indicating the PUCCH resource.

The repetition factor of the fifth PUCCH carrying UCI is determined through the above schemes, that is, a dynamic determination procedure of the repetition factor of the PUCCH carrying the UCI is performed.

In the present embodiment, in case that the target information is control information carried by a group common PDCCH, the PUCCH repetition factor can be determined based on received target information by the following scheme.

For the sixth PUCCH carrying UCI, the group common PDCCH periodically transmitted by the base station is received, where the group common PDCCH is scrambled through a radio network temporary identity (RNTI) to indicate that the group common PDCCH is used for notifying the PUCCH repetition factor. The group common PDCCH includes one or more information fields, each information field contains R bits, and each of the $2^R$ status values composed of the R bits corresponds to a PUCCH repetition factor, where R is a positive integer greater than or equal to 1. The UE then obtains an information field corresponding to itself from the one or more information fields, and determines the repetition factor of the sixth PUCCH based on the status value of the information field.

Each information field among the one or more information fields is configured with a PUCCH repetition factor for a group of UE on a carrier; or, each information field among the one or more information fields is configured with a UE-specific PUCCH repetition factor for UE.

In case that packet loss occurs on the group common PDCCH, the repetition factor of the sixth PUCCH is any one of the following items: a PUCCH repetition factor indicated by a previous group common PDCCH, a default PUCCH repetition factor or a PUCCH repetition factor configured by the RRC.

For example, in case that packet loss occurs on the group common PDCCH, the UE can reuse the PUCCH repetition factor indicated by the previous group common PDCCH, or use the default PUCCH repetition factor, or use the PUCCH repetition factor configured by the RRC.

The repetition factor of the sixth PUCCH carrying UCI is determined through the above schemes, that is, a dynamic determination procedure of the repetition factor of the PUCCH carrying the UCI is performed.

In the present embodiment, whether to use PRI field to determine the PUCCH repetition can be determined through a switch.

In an embodiment, in case that a bit switch configured by RRC indicates that PUCCH repetition factor is determined by the PRI field, the PUCCH repetition factor is determined based on the PRI field in received DCI; or, in case that a newly added bit switch in the DCI indicates that PUCCH repetition factor is determined by the PRI field, the PUCCH repetition factor is determined based on the PRI field in received DCI.

In an embodiment, a 1-bit switch can be configured for the RRC, and the manner of determining PUCCH repetition factor is determined through a bit status value. For example, the PUCCH repetition factor is semi-statically configured using the RRC in case that the bit status value is 0 and the PUCCH repetition factor is implicitly determined using the PRI field in case that the bit status value is 1 and vice versa. In an embodiment, a 1-bit switch can be newly added in the DCI, and the PUCCH repetition factor is determined through a bit status value. For example, the PUCCH repetition factor is semi-statically configured using the RRC in case that the bit status value is 0 and the PUCCH repetition factor is implicitly determined using the PRI field in case that the bit status value is 1 and vice versa.

In the method for determining the PUCCH repetition factor, the implicit or explicit dynamic indication of the PUCCH repetition factor are described, and a network side can flexibly adjust PUCCH repetition factor as the state of the radio channel changes, and thus the spectral utilization rate of the system is improved on the premise of satisfying the PUCCH coverage requirements.

FIG. 2 is a schematic flowchart showing steps of a method for determining a physical uplink control channel (PUCCH) repetition factor applied to a base station according to an embodiment of the present application. The method includes the following step:

step 201: transmitting target information to user equipment (UE), where the target information is used for determining a PUCCH repetition factor by the UE.

The target information includes first information or second information, the first information includes a PUCCH resource indication (PRI) field in downlink control information (DCI), and the second information includes a given field in DCI, a medium access control layer control element (MAC CE) or control information carried by a group common physical downlink control channel (PDCCH). For example, the given field may be a newly added field.

For example, the base station can transmit DCI to the UE, and the UE can determine a PUCCH repetition factor based on the PRI field in DCI, or the UE can determine a PUCCH repetition factor based on the DCI, or the base station can transmit MAC CE to the UE, and the UE can determine a PUCCH repetition factor based on the MAC CE, or the base station can transmit group common PDCCH to the UE and the UE can determine a PUCCH repetition factor based on the group common PDCCH.

By transmitting target information to the UE by the base station in the present embodiment and enabling the UE to determine the PUCCH repetition factor based on the target information, dynamic indication of the PUCCH repetition factor is implemented, which solves both the problem that the PUCCH repetition factor cannot be adjusted in case that PUCCH resources for the semi-static signal are obtained through RRC configuration and the problem that the PUCCH repetition factor cannot be arbitrarily selected in case that the PUCCH repetition factor and the PUCCH format are bound in traditional art.

In the present embodiment, in case that the target information is the PRI field in the DCI, the base station further performs the following steps:

transmitting a higher layer signaling to the UE, where the higher layer signaling is configured with a repetition factor of a first PUCCH corresponding to a first PUCCH resource, where the first PUCCH resource is a PUCCH resource indicated by a status value of the PRI field in DCI and the first PUCCH is a PUCCH carrying dynamically scheduled HARQ-ACK feedback; or determining a repetition factor of a second PUCCH corresponding to a second PUCCH resource based on a pre-obtained correspondence between status values of the PRI field and the PUCCH repetition factors, where the second PUCCH resource is a PUCCH resource indicated by a status value of the PRI field in the DCI, and the second PUCCH is a PUCCH carrying the dynamically scheduled HARQ-ACK feedback.

The correspondence between the status values of the PRI field and the PUCCH repetition factors is pre-agreed by the UE and the base station through a protocol; or the correspondence between the status values of the PRI field and the PUCCH repetition factors is transmitted to the UE through a target signaling, where the target signaling includes higher layer signaling, MAC CE or physical layer signaling.

For the description of the base station side, reference can be made to the related description of the UE side, which is not repeated.

In an embodiment, in case that the target information is DCI, a newly added field is included in the DCI, and the newly added field includes N bits or M bits. Each of the $2^N$ status values composed of the N bits corresponds to a PUCCH repetition factor, and each of the $2^M$ status values composed of the M bits corresponds to a scaling factor value.

In an embodiment, in case that the newly added field in the DCI includes N bits, the base station configures a PUCCH repetition factor corresponding to the newly added field to indicate a repetition factor of a third PUCCH corresponding to a third PUCCH resource, where the third PUCCH resource is a PUCCH resource indicated by a status value of the PRI field in the DCI and the third PUCCH is a PUCCH carrying the dynamic scheduling HARQ-ACK feedback; or in case that the newly added field includes M bits, the base station configures a scaling factor value corresponding to the newly added field to indicate the repetition factor of the third PUCCH;

both N and M are integers greater than or equal to 0, and the scaling factor value is a number greater than or equal to 0.

In an embodiment, in case that the third PUCCH resource corresponds to multiple DCI, the repetition factors of the third PUCCH determined based on the newly added field in each of the multiple DCI are the same; or, in case that the third PUCCH resource corresponds to multiple DCI and the repetition factors of the third PUCCH determined based on the newly added field in each DCI are different, the repetition factor of the third PUCCH is determined based on the lastly transmitted DCI, or a maximum value, or a minimum value or an average value among the PUCCH repetition factors determined based on all the multiple DCI is determined as the repetition factor of the third PUCCH.

For the specific description in case that the above-mentioned target information is the DCI, reference can be made to the method embodiment on the UE side, which is not repeated.

For the semi-static uplink channel information (UCI), a fourth PUCCH resource can be configured through higher layer signaling, and a repetition factor of a fourth PUCCH corresponding to the fourth PUCCH resource can be determined based on the PUCCH resource for a dynamically scheduled HARQ-ACK feedback, where the fourth PUCCH is a PUCCH carrying the semi-static UCI, and the PUCCH resource for the dynamically scheduled HARQ-ACK feedback is the above-mentioned second PUCCH resource or the third PUCCH resource.

In an embodiment, the repetition factor of the fourth PUCCH corresponding to the fourth PUCCH resource is determined by the base station based on the PUCCH resource for the dynamically scheduled HARQ-ACK feedback by the following schemes.

In scheme 1, a first target PUCCH resource having the same resource number as the fourth PUCCH resource is selected from PUCCH resources for the dynamically scheduled HARQ-ACK feedback, and the repetition factor of the fourth PUCCH is determined based on a repetition factor of a first target PUCCH corresponding to the first target PUCCH resource.

In scheme 2, in case that the semi-static UCI is channel situation information (CSI), a second target PUCCH resource having the same coding rate as the fourth PUCCH resource is selected from PUCCH resources for the dynamically scheduled HARQ-ACK feedback, and the repetition factor of the fourth PUCCH is determined based on a repetition factor of a second target PUCCH corresponding to the second target PUCCH resource.

In scheme 3, in case that the semi-static UCI is scheduling request (SR), a third target PUCCH resource having the same PUCCH format and the number of symbols occupied by the PUCCH format as the fourth PUCCH resource is selected from PUCCH resources for the dynamically scheduled HARQ-ACK feedback, and the repetition factor of the fourth PUCCH is determined based on a repetition factor of the third target PUCCH corresponding to the third target PUCCH resource.

In scheme 4, in case that the semi-static UCI is the HARQ-ACK feedback corresponding to the semi-persistent scheduling (SPS) physical downlink shared channel (PDSCH), the repetition factor of the fourth PUCCH is determined based on PUCCH repetition factors corresponding to status values of the PRI field in the target DCI, where the target DCI is a DCI activating the SPS.

In case that the number of the above-mentioned target PUCCH resources is at least two, the maximum value, the minimum value or the average value among the repetition factors corresponding to all the target PUCCH resources can be determined as the repetition factor of the fourth PUCCH; the target PUCCH resource is the first target PUCCH resource, the second target PUCCH resource or the third target PUCCH resource.

For a specific manner of determining the repetition factor of the above-mentioned PUCCH carrying semi-static UCI, reference can be made to the method embodiment on the UE side, which is not repeated.

In the present embodiment, for a fifth PUCCH carrying UCI, in case that the target information is MAC CE, transmitting the target information to the UE can include the following steps.

For the fifth PUCCH carrying the UCI, the base station transmits the MAC CE to the UE, where the MAC CE includes one or more repetition factor indication fields, and each repetition factor indication field is used for indicating a repetition factor corresponding to a PUCCH resource or a group of PUCCH resources. In case that the MAC CE takes effect, the UE determines the repetition factor of the fifth PUCCH based on one or more repetition factor indication fields in the MAC CE.

In an embodiment, the time of taking effect of the MAC CE is time after the UE transmits the HARQ-ACK feedback to the base station after receiving the MAC CE and the base station receives the HARQ-ACK feedback.

In case that the MAC CE does not take effect, the repetition factor of the fifth PUCCH is determined to be a preset value or a repetition factor configured by the RRC.

For a specific manner of determining the repetition factor of the above-mentioned PUCCH carrying the UCI in case that the target information is MAC CE, reference can be made to the method embodiment on the UE side, which is not repeated.

In the present embodiment, for a sixth PUCCH carrying UCI, in case that the target information is control information carried by a group common PDCCH, the transmitting the target information to the UE can include the following steps.

For the sixth PUCCH carrying UCI, the base station periodically transmits the group common PDCCH, where the group common PDCCH is scrambled through a radio network temporary identity (RNTI) to indicate that the group common PDCCH is used for notifying the PUCCH repetition factor. The group common PDCCH includes one or more information fields, each information field contains R bits, and each of the $2^R$ status values composed of the R bits corresponds to a PUCCH repetition factor. The UE then obtains an information field corresponding to itself from the one or more information fields, and determines the repetition factor of the sixth PUCCH based on the status value of the information field. R is a positive integer greater than or equal to 1.

Each information field among the one or more information fields is configured with a PUCCH repetition factor for a group of UE on a carrier; or, each information field among the one or more information fields is configured with a UE-specific PUCCH repetition factor for UE.

In case that packet loss occurs on the group common PDCCH, the repetition factor of the sixth PUCCH can be configured as any one of the following items:
a PUCCH repetition factor indicated by a previous group common PDCCH, a default PUCCH repetition factor or a PUCCH repetition factor configured by the RRC.

For a specific manner of determining the repetition factor of the above-mentioned PUCCH carrying the UCI in case that the target information is the group common PDCCH, reference can be made to the method embodiment on the UE side, which is not repeated.

In the present embodiment, a bit switch can be configured in the RRC to indicate the UE to determine the PUCCH repetition factor based on the PRI field in the received DCI; or a bit switch is added in the DCI to indicate the UE to determine the PUCCH repetition factor based on the PRI field in the received DCI.

For the description of the bit switch, reference can be made to the related description of the UE side, which is not repeated.

The present application is described below through detail embodiments.

In embodiment 1, for dynamically scheduled HARQ-ACK feedback, a PUCCH repetition factor is configured through higher layer signaling.

The higher layer signaling may be RRC signaling, and the RRC signaling configures a repetition factor of a first PUCCH corresponding to each PUCCH resource for each PUCCH resource. For example, RRC is used for indicating the repetition factor corresponding to the current PUCCH resource. At this time, a parameter such as the repetition factor is added as the repetition factor corresponding to the current PUCCH resource while parameters such as starting symbol, symbol length, and RB position for a PUCCH resource corresponding to a PUCCH format are configured. Assuming that the UE transmitting the dynamically scheduled HARQ-ACK feedback is configured with 32 PUCCH resources which are divided into 4 resource sets, each resource set includes 8 PUCCH resources, and each PUCCH resource corresponds to a repetition factor configured by RRC signaling.

The UE first determines a resource set based on UCI bits to be transmitted, and then determines a PUCCH resource based on the indication of a PRI field in the DCI signaling which schedules PDSCH, and repeats the transmission of a first PUCCH base on the repetition factor of the first PUCCH configured by the RRC signaling, where the first PUCCH carries the dynamically scheduled HARQ-ACK feedback.

Among eight PUCCH resources in a resource set, some PUCCH resources may be configured with the same resource location and PUCCH format, but with different repetition factors, or may be configured with arbitrarily resource locations, PUCCH formats and repetition factors, which depends on the configuration of the base station. For example, PUCCH resource 1 corresponding to PUCCH format 1 occupies 4 OFDM symbols from a first OFDM symbol of a slot, and the corresponding repetition factor of the PUCCH resource 1 is 4; and PUCCH resource 2 corresponding to PUCCH format 1 occupies 4 OFDM symbols from a first OFDM symbol of a slot, and the corresponding repetition factor of the PUCCH resource 2 is 2. In case that the PRI field indicates PUCCH resource 1, the PUCCH repetition factor is 4; and in case that the PRI field indicates PUCCH resource 2, the PUCCH repetition factor is 2. In case that no corresponding repetition factor of the PUCCH resource is configured in the RRC signaling, the UE determines a repetition factor of a PUCCH carrying the dynamically scheduled HARQ-ACK feedback based on the repetition factor bundled to the PUCCH format in traditional art. For example, in case that the repetition factor configured by the RRC for PUCCH format 1 is 8, the repetition factor of the PUCCH carrying the dynamically scheduled HARQ-ACK feedback is 8 in case that no corresponding repetition factor of the PUCCH resource is configured in the RRC signaling.

In an embodiment, a 1-bit switch can be used for controlling whether to adopt the above scheme. In an embodiment, the 1-bit switch is configured by RRC or indicated by DCI.

Mode 1: RRC configures a 1-bit switch to indicate whether to adopt the above scheme. The UE determines the repetition factor of the current PUCCH based on the repetition factor bundled to the PUCCH format in traditional art in case that a value of the bit switch is 0; or determines the repetition factor of the current PUCCH by the above schemes in case that a value of the bit switch is 1 and vice versa.

Mode 2: A 1-bit switch is added in the DCI signaling to indicate whether to adopt the above scheme. The UE determines the repetition factor of the current PUCCH based on the repetition factor bundled to the PUCCH format in traditional art in case that a value of the bit switch is 0; or determines the repetition factor of the current PUCCH by the above schemes in case that a value of the bit switch is 1 and vice versa.

In embodiment 2, for dynamically scheduled HARQ-ACK feedback, a PUCCH repetition factor is indicated through the status value of the PRI.

In the present embodiment, for the dynamically scheduled HARQ-ACK feedback, the UE indicates the PUCCH repetition factor while indicating the PUCCH resource through the PRI. As shown in the Table 1, a status value of the PRI field corresponds to a repetition factor. It should be noted that the values of the repetition factor in the tables of the present application are only examples.

In the present embodiment, the PUCCH repetition factor corresponds to status values of the PRI field. The PUCCH repetition factor corresponding to each status value of the PRI field can be determined through higher layer signaling, MAC CE, or physical layer signaling, and then different PUCCH resources can be selected through different status values of the PRI field to implement the dynamic indication of the repetition factors. For example, in case that UE determines to use resource set 1 based on the UCI bits and the status value of the PRI field in the DCI transmitted to the UE is "000", the UE is indicated to select a first resource in resource set 1, it is determined from the correspondence in the above table that the PUCCH repetition factor corresponding to "000" is 4, and then it is determined that the repetition factor corresponding to a first PUCCH resource in resource set 1 is 4; and in case that the status value of the PRI field in the DCI transmitted to the UE is "001", the UE is indicated to select a second resource in resource set 1, it is determined from the correspondence in the above table that the PUCCH repetition factor corresponding to "001" is 2, and then it is determined that the repetition factor corresponding to a second PUCCH resource in resource set 1 is 2.

In addition, the repetition factor of PUCCH carrying the semi-static UCI can be determined based on the correspondence between the PUCCH resources for the semi-static UCI and the PUCCH resources for the dynamically scheduled HARQ-ACK feedback. PUCCHs carrying dynamically scheduled HARQ-ACK feedback that have correspondence with PUCCHs carrying semi-static UCI have been indicated by PRI field for dynamic transmission, and repetition factors corresponding to these PUCCHs carrying dynamically scheduled HARQ-ACK feedback are determined by the status values of the PRI field according to the above method. In the present embodiment, for semi-static UCI such as CSI, SR, and HARQ-ACK for SPS PDSCH, PUCCH repetition factor can be determined by configuring the same resource number as some resources in the PUCCH resource set for dynamically scheduled HARQ-ACK feedback by the RRC. For example, the base station configures 8 PUCCH resources in resource set 1 for dynamically scheduled HARQ-ACK feedback. According to the above method, the PUCCH repetition factor corresponding to the first PUCCH resource in the resource set 1 is 4, and the PUCCH repetition factor corresponding to the second PUCCH resource in the resource set 1 is 2. In case that the PUCCH resource for the semi-static signal SR is the second PUCCH resource in the resource set 1, the repetition factor of the PUCCH carrying the SR is determined to be 2 based on a repetition factor corresponding to the PUCCH resource for dynamically scheduled HARQ-ACK feedback having the same resource number. The repetition factor of the PUCCH resource carrying the CSI or the HARQ-ACK of the SPS PDSCH is similarly determined.

For semi-static UCI such as CSI, SR, and HARQ-ACK for SPS PDSCH, the PUCCH repetition factor is determined implicitly as follows.

Case 1: In case that the semi-static UCI is CSI, a PUCCH resource for the dynamically scheduled HARQ-ACK feedback having the same coding rate is selected based on the coding rate corresponding to the PUCCH resource configured by the RRC for the CSI and the repetition factor corresponding to the PUCCH resource for the dynamically scheduled HARQ-ACK feedback having the same coding rate is the repetition factor of the PUCCH carrying the CSI.

For example, the PUCCH repetition factors corresponding to only the first to fourth PUCCH resources in resource set 1 are determined by the status values of the PRI field in the above manner. The coding rate corresponding to the first PUCCH resource is 30/1024, and the repetition factor is 4; the coding rate corresponding to the second PUCCH resource is 50/1024, the repetition factor is 2; the coding rate corresponding to the third PUCCH resource is 120/1024, the repetition factor is 4; and the coding rate corresponding to the fourth PUCCH resource is 50/1024, and the repetition factor is 8. In case that the coding rate corresponding to the PUCCH resource configured by the RRC for the CSI is 30/1024, the UE selects the first PUCCH resource having the same coding rate to determine the repetition factor of the PUCCH carrying CSI to be 4.

Case 2: In case that the semi-static UCI is SR, the UE selects a PUCCH resource for the dynamically scheduled HARQ-ACK feedback having the same PUCCH format and the number of symbols (nrofSymbols) occupied by the PUCCH format based on the PUCCH format and nrofSymbols occupied by the PUCCH corresponding to the PUCCH resource configured by RRC for the SR, and determines the repetition factors corresponding to the selected PUCCH resource to be the repetition factor of the PUCCH carrying SR.

For example, the PUCCH repetition factors corresponding to only the first to fourth PUCCH resources in resource set 1 are determined by the status values of the PRI field in the above manner. The first PUCCH resource corresponds to PUCCH format 0 occupying 2 symbols, and the repetition factor is 4; the second PUCCH resource corresponds to PUCCH format 1 occupying 6 symbols, and the repetition factor is 2; the third PUCCH resource corresponds to PUCCH format 3 occupying 10 symbols, and the repetition factor is 4; and the fourth PUCCH resource corresponds to PUCCH format 0 occupying 2 symbols, and the repetition factor is 8. In case that the PUCCH resource configured by the RRC for the SR corresponds to PUCCH format 1 occupying 6 symbols, the UE selects the second PUCCH resource having the same PUCCH format and the number of symbols (nrofSymbols) occupied by the PUCCH format and determines the repetition factor of the PUCCH carrying SR to be 2.

Case 3: In case that the semi-static UCI is the HARQ-ACK feedback corresponding to the SPS PDSCH, the repetition factor of the PUCCH carrying the UCI is determined based on the repetition factor corresponding to the status values of the PRI field in an activation DCI of the current SPS configuration.

For example, in case that the status value of the PRI field in the active DCI transmitted for the SPS configuration of UE is "111", the repetition factor corresponding to the PUCCH resource carrying the HARQ-ACK feedback for the SPS PDSCH is determined to be 4 based on the correspondence in the present embodiment.

For the above-mentioned semi-static UCI, in the procedure of determining the corresponding repetition factor, in case that the PUCCH resource carrying CSI corresponds to multiple PUCCH resources for the dynamically scheduled HARQ-ACK feedback having the same coding rate, a maximum value, or a minimum value or an average value of repetition factors corresponding to all the PUCCH resources is selected as the PUCCH repetition factor. Taking the coding rates and repetition factors corresponding to the first to fourth PUCCH resources in the above resource set 1 as an example, in case that the coding rate corresponding to the PUCCH resource configured by the RRC for the CSI is 50/1024, there are two PUCCH resources having the same coding rate in resource set 1, i.e., the second PUCCH resource with a repetition factor of 2 and the fourth PUCCH resource with a repetition factor of 8. In case that the maximum value of the repetition factor among all the corresponding PUCCH resources is selected, the repetition factor corresponding to the PUCCH resource carrying CSI is 8; in case that the minimum value is selected, the repetition factor corresponding to the PUCCH resource carrying CSI is 2; and in case that the average value is selected, the repetition factor corresponding to the PUCCH resource carrying CSI is For PUCCH resources carrying SR corresponding to multiple PUCCH resources for the dynamically scheduled HARQ-ACK feedback having the same PUCCH format and the number of symbols (nrofSymbols) occupied by the PUCCH format, the maximum value, or the minimum value or an average value of repetition factors corresponding to all the PUCCH resources is selected as the PUCCH repetition factor.

In an embodiment, a 1-bit switch can be used for controlling whether to adopt the above scheme. In an embodiment, the 1-bit switch is configured by RRC or indicated by DCI.

Mode 1: the RRC configures a 1-bit switch to indicate whether to adopt the above scheme. The UE determines the repetition factor of the current PUCCH based on the repetition factor bundled to the PUCCH format in traditional art in case that a value of the bit switch is 0; or determines the repetition factor of the current PUCCH based on the repetition factors corresponding to the status values of the PRI field in case that a value of the bit switch is 1 and vice versa.

Mode 2: A 1-bit switch is added in the DCI signaling to indicate whether to adopt the above scheme. The UE determines the repetition factor of the current PUCCH based on the repetition factor bundled to the PUCCH format in traditional art in case that a value of the bit switch is 0; or determines the repetition factor of the current PUCCH based on the repetition factors corresponding to the status values of the PRI field in case that a value of the bit switch is 1 and vice versa.

In embodiment 3, for dynamically scheduled HARQ-ACK feedback, a PUCCH repetition factor is indicated by adding an N-bit field to the DCI.

A newly added field is included in the DCI signaling for scheduling PDSCH received by the UE. The newly added field includes N bits, and $2^N$ status values composed of N bits are used for indicating $2^N$ candidate values of PUCCH repetition factor. The candidate values of the PUCCH repetition factor may be predefined or configured by the RRC. For example, in case that N is equal to 2, the newly added field can contain four predefined values of {1, 2, 4, 8}.

In the present embodiment, the correspondence between the status values of the newly added field and the repetition factors of the PUCCH carrying the HARQ-ACK feedback of the current PDSCH is shown in Table 2 below. The values of the PUCCH repetition factor in the tables in the present embodiment are exemplary only, a larger repetition factor may be selected, which is not specifically limited herein.

TABLE 2

| Status values of the newly added field | PUCCH repetition factors |
|---|---|
| 00 | 1 |
| 01 | 2 |
| 10 | 4 |
| 11 | 8 |

After the UE receives the DCI signaling, the PUCCH repetition factor is determined through the status values of the newly added field. Further, in case that there are multiple DCI correspondingly feeding back HARQ-ACK in the same slot or sub-slot, as shown in FIG. 3, there are schemes as follows.

Scheme 1: The status values of the newly added fields in the multiple DCI received by the UE correspondingly feeding back HARQ-ACK in the same slot or sub-slot must be the same. For example, the status values of newly added fields in all the DCI signalings indicating that HARQ-ACK is fed back in slot n are 01 and the PUCCH repetition factor in slot n is 2.

Scheme 2: The status values of the newly added fields in the multiple DCI received by the UE correspondingly feeding back HARQ-ACK in the same slot or sub-slot may be different. For example, the status value of the newly added field in the DCI in slot n-3 is 01, which indicates that PUCCH repetition factor is 2, and the status value of the newly added field in the DCI in slot n-2 is 10, which indicates that PUCCH repetition factor is 4.

The UE determines the PUCCH repetition factor to be 4 based on the status value of the newly added field in the DCI in the last slot n-2; or selects the maximum value, or the minimum value or an average value of the PUCCH repetition factors corresponding to the status values of the newly added fields in all the DCI fed back within slot n corresponding to slot n-3 to slot n-1. In case that the maximum value is selected, the PUCCH repetition factor in slot n is 4; in case that the minimum value is selected, the PUCCH repetition factor in slot n is 2; in case that the average value is selected, the PUCCH repetition factor in slot n is 3. In case that the average value is non-integer, the non-integer can be rounded up or down.

In case that there are semi-static UCIs such as CSI, SR, and HARQ-ACK of SPS PDSCH, a PUCCH repetition factor carrying the semi-static UCI is determined by the similar determination procedure of the repetition factor of the corresponding PUCCH resource for dynamically scheduled HARQ-ACK feedback. The specific procedure refers to embodiment 2 except that only the determination of the repetition factor of the corresponding PUCCH carrying the dynamically scheduled HARQ-ACK feedback can be replaced with the process in the present embodiment, which is not repeated.

In embodiment 4, for dynamically scheduled HARQ-ACK feedback, a PUCCH repetition factor is indicated by adding an N-bit field to the DCI.

A newly added field is included in the DCI signaling for scheduling PDSCH received by the UE. The newly added field includes M bits, and $2^M$ status values composed of M bits are used for indicating $2^M$ scaling factors. The scaling factors may be predefined or configured by the RRC. The dynamically indicated PUCCH repetition factor is determined by the PUCCH repetition factor configured by the RRC and the scaling factor indicated by the newly added field.

In the present embodiment, in case that the scaling factor corresponding to one status value is 1, it indicates that the traditional mechanism is used and no scaling is performed. For example, when M=2, it is assumed that the newly added field contains predetermined four values {1, 2, 3,4}. In the present embodiment, the correspondence between the status values of the newly added field and the repetition factors of the PUCCH carrying the HARQ-ACK feedback of the current PDSCH is shown in Table 3 below.

TABLE 3

| Status values of the newly added field | PUCCH repetition factors |
|---|---|
| 00 | 1*nrofslots |
| 01 | 2*nrofslots |
| 10 | 3*nrofslots |
| 11 | 4*nrofslots |

Where nrofslots is the PUCCH repetition factor configured by RRC. After the UE receives the DCI signaling, the repetition factor of the current PUCCH is determined through the status value of the newly added field and the PUCCH repetition factor configured by the RRC. For example, in case that the status value of the newly added field is 00, it indicates that the UE uses the traditional mechanism and does not scale the PUCCH repetition factor. In case that the status value of the newly added field is 00, when the RRC configures the PUCCH repetition factor to be 2, the finally dynamically indicated PUCCH repetition factor is 2×2=4. In case that there are multiple DCI indicating the scaling factor, the procedure of determining the scaling factor indicated by the newly added field is the same as the procedure of determining the repetition factor indicated by the second field in Embodiment 4.

The values of the scaling factor in the table in the present embodiment is only exemplary, and it is not excluded that the scaling factor is a decimal to reduce the PUCCH repetition factor. In case that there are semi-static UCIs such as CSI, SR, and HARQ-ACK of SPS PDSCH, a repetition factor of PUCCH carrying the semi-static UCI is determined by the similar determination procedure of the repetition factor of PUCCH resource for dynamically scheduled HARQ-ACK feedback. The specific procedure refers to embodiments 2 and 3 except that only the determination of the repetition factor corresponding to the PUCCH carrying the dynamically scheduled HARQ-ACK feedback may be replaced with the process in the present embodiment.

In embodiment 5, a PUCCH repetition factor is indicated by the MAC CE.

After receiving the MAC CE transmitted by the higher layer through the PDSCH, the UE obtains the dynamically indicated PUCCH repetition factor from it, and feeds back the HARQ-ACK to the base station. In an embodiment, one MAC CE indicates a repetition factor corresponding to one or a group of PUCCH resources. In the present embodiment, the time of taking effect of the current MAC CE needs to be subsequent to time at which the base station receives the ACK fed back by the UE.

It is assumed that a repetition factor indication field Repi occupies 2 bits to indicate 4 candidate repetition factors.

In case that a repetition factor indication field is used for indicating a repetition of transmission corresponding to a PUCCH resource, the resource number of the PUCCH can be in one-to-one correspondence with the index of the repetition factor indication field;

in case that a repetition factor indication field is used for indicating a repetition of transmission corresponding to a group of PUCCH resources, the number of the group of PUCCH resources can correspond to the index of a repetition factor indication field. In this case, the PUCCH resources are grouped. The PUCCH resources for dynamically scheduled HARQ-ACK feedback can be grouped according to the PUCCH resource set, or can be further grouped in a PUCCH resource set. The PUCCH resources for the semi-static signal can be grouped separately or grouped together with the PUCCH resources for dynamically scheduled HARQ-ACK feedback, and the grouping method is not limited here.

In embodiment 6, a PUCCH repetition factor is indicated through the group common PDCCH.

After receiving the periodically transmitted group common (GC) PDCCH, the UE obtains dynamically indicated PUCCH repetition factor therefrom. The transmission period of the group common PDCCH is configured by higher layer, and the higher layer signaling configures a new RNTI for the UE to identify that the group common PDCCH is used for notifying the PUCCH repetition factor. In addition, a group common PDCCH can carry multiple information fields to indicate different repetition factor, multiple UE performing multicast in the same group are configured with the same indication information, and UE in different groups are distinguished through different information fields.

The base station scrambles the CRC part of the channel information using the RNTI before transmitting, and the UE uses the corresponding RNTI value to correctly decode the received information to determine whether the multicast information transmitted by the base station corresponds to the UE using the RNTI used for decoding. In the present embodiment, it is assumed that the group common PDCCH received by the UE is scrambled by Rep-PUCCH-RNTI, and the UE obtains the indication information of the base station after decoding to determine the PUCCH repetition factor. The indication information is contained in one information field of the group common PDCCH, one information field contains R bits, and the $2^R$ states are used for indicating the $2^R$ candidate values of PUCCH repetition factor. For example, in case that R is equal to 2, the information field contains predetermined four values of {1, 2, 4, 8}. In the present embodiment, the correspondence between the status values of information field and the PUCCH repetition factors is shown in Table 4 below.

TABLE 4

| Status values of information field | PUCCH repetition factors |
| --- | --- |
| 00 | 1 |
| 01 | 2 |
| 10 | 4 |
| 11 | 8 |

A group common PDCCH can carry multiple information fields, and one information field can correspond to one or a group of UE.

Scheme 1: One information field configures a common repetition factor for a group of UE on one carrier, and a group common DCI can configure the same or different repetition factors for multiple carriers, as shown in FIG. 4, the correspondence between the information fields and the carriers is configured by higher layer signaling. In FIG. 4, the group common PDCCH configures a repetition factor for each carrier (CC for short), and the repetition factor is represented by the value of VALUE. Present embodiment is only for reference.

Scheme 2: One information field configures a UE-specific repetition factor for UE, and a group common DCI can configure the same or different repetition factors for multiple UE, as shown in FIG. 5, the correspondence between the information fields and the UE is configured by higher layer signaling. In FIG. 5, the group common PDCCH configures a repetition factor for each UE, and the repetition factor is represented by the value of VALUE. Present embodiment is only for reference.

In the above two schemes, there may be a situation that the UE does not receive the group common PDCCH due to packet loss. In this case, the UE determines the PUCCH repetition factor by reusing an indication of the previous group common PDCCH; or the UE determines the PUCCH repetition factor by the RRC configuration in traditional art; or the UE determines the PUCCH repetition factor by using a configured default value.

In the embodiments above, the procedure of dynamically determining the PUCCH repetition factor is implemented and a network side can flexibly adjust PUCCH repetition factor as the state of the radio channel changes, the spectral utilization rate of the system is improved on the premise of satisfying the PUCCH coverage requirements.

Figure 6:
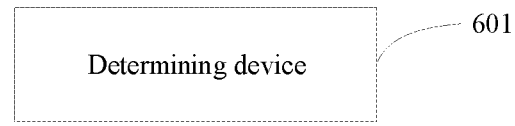
FIG. 6 is a schematic block diagram of a device for determining a PUCCH repetition factor applied to UE according to an embodiment of the present application.

FIG. 6 is a schematic block diagram of a device for determining a physical uplink control channel (PUCCH) repetition factor applied to user equipment (UE) according to an embodiment of the present application. The device includes:

a determining device 601, used for determining a PUCCH repetition factor based on received target information;

where the target information includes first information or second information, the first information includes a PUCCH resource indication (PRI) field in downlink control information (DCI), and the second information includes a given field in DCI, a medium access control layer control element (MAC CE) or control information carried by a group common physical downlink control channel (PDCCH). For example, the given field may be a newly added field.

In an embodiment, in case that the target information is the PRI field in DCI, the determining device includes:
a first determining device, used for determining a first PUCCH resource for a dynamically scheduled hybrid automatic repeat request-acknowledge (HARQ-ACK) feedback based on a status value of the PRI field in DCI, and determining a repetition factor of a first PUCCH corresponding to the first PUCCH resource based on a received higher layer signaling, where the first PUCCH is a PUCCH carrying the dynamically scheduled HARQ-ACK feedback and the higher layer signaling is configured with the repetition factor of the first PUCCH corresponding to the first PUCCH resource; or
a second determining device, used for determining a second PUCCH resource for a dynamically scheduled HARQ-ACK feedback based on a status value of the PRI field in DCI, and determining a repetition factor of a second PUCCH corresponding to the second PUCCH resource based on pre-obtained correspondence between status values of the PRI field and PUCCH repetition factors, where the second PUCCH is a PUCCH carrying the dynamically scheduled HARQ-ACK feedback.

In an embodiment, the correspondence between the status values of the PRI field and the PUCCH repetition factors is pre-agreed by user equipment (UE) and a base station through a protocol; or
the correspondence between the status values of the PRI field and the PUCCH repetition factors is pre-configured through a target signaling, where the target signaling includes a higher layer signaling, a MAC CE or a physical layer signaling.

In an embodiment, a newly added field is included in the DCI, and the newly added field includes N bits or M bits, each of $2^N$ status values composed of the N bits corresponds to a PUCCH repetition factor, and each of $2^M$ status values composed of the M bits corresponds to a scaling factor value.

In case that the target information is the DCI, the determining device includes:
a third determining device, used for:
determining a third PUCCH resource for dynamically scheduled HARQ-ACK feedback based on a status value of a PRI field in the DCI;
determining, in case that the newly added field in the DCI includes N bits, a PUCCH repetition factor corresponding to the newly added field as a repetition factor of a third PUCCH corresponding to the third PUCCH resource, where the third PUCCH is a PUCCH carrying the dynamically scheduled HARQ-ACK feedback; and
scaling, in case that the newly added field includes M bits, a semi-static PUCCH repetition factor configured by a radio resource control (RRC) based on the scaling factor value corresponding to the newly added field, to obtain the repetition factor of the third PUCCH;
both N and M are integers greater than or equal to 0, and the scaling factor value is a number greater than or equal to 0.

In an embodiment, in case that the third PUCCH resource corresponds to multiple DCI, repetition factors of the third PUCCH determined based on the newly added field in each of the multiple DCI are the same. In one embodiment, in case that the third PUCCH resource corresponds to multiple DCI and the repetition factors of the third PUCCH determined based on the newly added field in each DCI are different, the repetition factor of the third PUCCH is determined based on lastly received DCI, or a maximum value, or a minimum value or an average value among PUCCH repetition factors determined based on all the multiple DCI is determined as the repetition factor of the third PUCCH.

In an embodiment, the device further includes:
an obtaining device, used for obtaining, for the semi-static uplink channel information (UCI), a fourth PUCCH resource configured through higher layer signaling, and determining a repetition factor of a fourth PUCCH corresponding to the fourth PUCCH resource based on the PUCCH resource for the dynamically scheduled HARQ-ACK feedback, where the fourth PUCCH is a PUCCH carrying the semi-static UCI, and the PUCCH resource for the dynamically scheduled HARQ-ACK feedback is the second PUCCH resource or the third PUCCH resource.

In an embodiment, the determining the repetition factor of the fourth PUCCH corresponding to the fourth PUCCH resource based on the PUCCH resource for the dynamically scheduled HARQ-ACK feedback includes:
selecting a first target PUCCH resource having the same resource number as the fourth PUCCH resource from PUCCH resources for the dynamically scheduled HARQ-ACK feedback, and determining the repetition factor of the fourth PUCCH based on a repetition factor of a first target PUCCH corresponding to the first target PUCCH resource; or
selecting, in case that the semi-static UCI is channel situation information (CSI), a second target PUCCH resource having the same coding rate as the fourth PUCCH resource from PUCCH resources for the dynamically scheduled HARQ-ACK feedback, and determining the repetition factor of the fourth PUCCH based on a repetition factor of a second target PUCCH corresponding to the second target PUCCH resource; or
selecting, in case that the semi-static UCI is scheduling request (SR), a third target PUCCH resource having the same PUCCH format and number of symbols occupied by the PUCCH format as the fourth PUCCH resource from PUCCH resources for the dynamically scheduled HARQ-ACK feedback, and determining the repetition factor of the fourth PUCCH based on a repetition factor of a third target PUCCH corresponding to the third target PUCCH resource; or
determining, in case that the semi-static UCI is an HARQ-ACK feedback corresponding to a semi-persistent scheduling (SPS) physical downlink shared channel (PDSCH), the repetition factor of the fourth PUCCH based on PUCCH repetition factors corresponding to status values of the PRI field in the target DCI, where the target DCI is a DCI activating the SPS.

In an embodiment, in case that the number of the target PUCCH resources is at least two, a maximum value, a minimum value or an average value among repetition factors corresponding to all the target PUCCH resources is determined as the repetition factor of the fourth PUCCH and the target PUCCH resource is the first target PUCCH resource, the second target PUCCH resource or the third target PUCCH resource.

In an embodiment, in case that the target information is the MAC CE, the determining device includes:
a first receiving device, used for receiving, for a fifth PUCCH carrying UCI, a MAC CE transmitted by the base station, where the MAC CE includes one or more repetition factor indication fields, and each repetition factor indication field is used for indicating a repetition factor corresponding to a PUCCH resource or a group of PUCCH resources; and a fourth determining device, used for determining, in case that the MAC CE takes effect, a repetition factor of the fifth PUCCH based on one or more repetition factor indication fields in the MAC CE;

where time of taking effect of the MAC CE is time after the UE transmits the HARQ-ACK feedback to the base station after receiving the MAC CE and the base station receives the HARQ-ACK feedback.

In an embodiment, in case that the MAC CE does not take effect, the repetition factor of the fifth PUCCH is determined to be a preset value or a repetition factor configured by the RRC.

In an embodiment, in case that the target information is control information carried by the group common PDCCH, the determining device includes:

a second receiving device, used for receiving, for a sixth PUCCH carrying UCI, group common PDCCH periodically transmitted by the base station, where the group common PDCCH is scrambled by a radio network temporary identity (RNTI) to indicate that the group common PDCCH is used for notifying a PUCCH repetition factor. The group common PDCCH includes one or more information fields, each information field contains R bits, and each of $2^R$ status values composed of R bits corresponds to a PUCCH repetition factor, and R is a positive integer greater than or equal to 1; and a fifth determining device, used for obtaining, by the UE, an information field corresponding to itself from the one or more information fields, and determining a repetition factor of the sixth PUCCH based on status value of the information field.

In an embodiment, each of the one or more information fields is configured with one PUCCH repetition factor for a group of UE on a carrier; or, each of the one or more information fields is configured with a UE-specific PUCCH repetition factor for UE.

In an embodiment, in case that packet loss occurs on the group common PDCCH, the repetition factor of the sixth PUCCH is any one of the following items:

a PUCCH repetition factor indicated by a previous group common PDCCH, a default PUCCH repetition factor or a PUCCH repetition factor configured by RRC.

In an embodiment, the determining device is further used for:

determining, in case that a bit switch configured by RRC indicates that PUCCH repetition factor is determined by PRI field, the PUCCH repetition factor based on the PRI field in the received DCI; or determining, in case that a newly added bit switch in the DCI indicates that PUCCH repetition factor is determined by PRI field, the PUCCH repetition factor based on the PRI field in the received DCI.

The device according to the present embodiment can perform all the method steps that can be implemented by the above-mentioned UE-side method embodiments, and can provide the same effect, which is not repeated.

Figure 7:
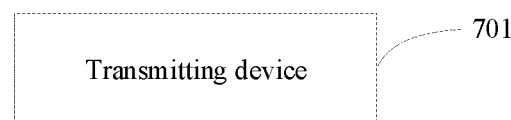
FIG. 7 is a schematic block diagram of a device for determining a PUCCH repetition factor applied to a base station according to an embodiment of the present application.

FIG. 7 is a schematic block diagram of a device for determining a physical uplink control channel (PUCCH) repetition factor applied to a base station according to an embodiment of the present application. The device includes:

a transmitting device 701, used for transmitting target information to user equipment (UE), where the target information is used for enabling the UE to determine a PUCCH repetition factor;

where the target information includes first information or second information, the first information includes a PUCCH resource indication (PRI) field in downlink control information (DCI), and the second information includes a given field in DCI, a medium access control layer control element (MAC CE) or control information carried by a group common physical downlink control channel (PDCCH). For example, the given field may be a newly added field.

The device according to the present embodiment can perform all the method steps that can be implemented by the above-mentioned base station-side method embodiments, and can provide the same effect, which is not repeated.

In an embodiment, in case that the target information is the PRI field in DCI, the transmitting device 701 is further used for:

transmitting higher layer signaling to the UE, where the higher layer signaling is configured with a repetition factor of a first PUCCH corresponding to a first PUCCH resource, where the first PUCCH resource is a PUCCH resource indicated by a status value of the PRI field in the DCI, and the first PUCCH is a PUCCH carrying dynamically scheduled hybrid automatic repeat request-acknowledge (HARQ-ACK) feedback; or determining a repetition factor of a second PUCCH corresponding to a second PUCCH resource based on pre-obtained correspondence between the status values of the PRI field and the PUCCH repetition factors, where the second PUCCH resource is a PUCCH resource indicated by a status value of the PRI field in the DCI, and the second PUCCH is a PUCCH carrying the dynamically scheduled HARQ-ACK feedback.

In an embodiment, the correspondence between the status values of the PRI field and the PUCCH repetition factors is pre-agreed by the UE and the base station through a protocol; or the correspondence between the status values of the PRI field and the PUCCH repetition factors is transmitted to the UE through a target signaling, where the target signaling includes higher layer signaling, MAC CE or physical layer signaling.

In an embodiment, a newly added field is included in the DCI, and the newly added field includes N bits or M bits. Each of $2^N$ status values composed of the N bits corresponds to a PUCCH repetition factor, and each of $2^M$ status values composed of the M bits corresponds to a scaling factor value;

in case that the target information is the DCI, the device further includes a configuring device, used for:

configuring, in case that the newly added field in the DCI includes N bits, a PUCCH repetition factor corresponding to the newly added field to indicate a repetition factor of a third PUCCH corresponding to a third PUCCH resource, where the third PUCCH resource is a PUCCH resource indicated by a status value of the PRI field in the DCI and the third PUCCH is a PUCCH carrying the dynamically scheduled HARQ-ACK feedback; or configuring, in case that the newly added field includes M bits, a scaling factor value corresponding to the newly added field to indicate the repetition factor of the third PUCCH;

both N and M are integers greater than or equal to 0, and the scaling factor value is a number greater than or equal to 0.

In an embodiment, in case that the third PUCCH resource corresponds to multiple DCI, repetition factors of the third PUCCH determined based on the newly added field in each of the multiple DCI are the same; or in case that the third PUCCH resource corresponds to multiple DCI and the repetition factors of the third PUCCH determined based on the newly added field in each DCI are different, the repetition factor of the third PUCCH is determined based on lastly transmitted DCI, or a maximum value, or a minimum value or an average value among PUCCH repetition factors determined based on all the multiple DCI is determined as the repetition factor of the third PUCCH.

In an embodiment, for the semi-static uplink channel information (UCI), a fourth PUCCH resource is configured through higher layer signaling, and a repetition factor of a fourth PUCCH corresponding to the fourth PUCCH resource is determined based on the PUCCH resource for the dynamically scheduled HARQ-ACK feedback, where the fourth PUCCH is a PUCCH carrying the semi-static UCI, and the PUCCH resource for the dynamically scheduled HARQ-ACK feedback is the second PUCCH resource or the third PUCCH resource.

In an embodiment, the repetition factor of the fourth PUCCH corresponding to the fourth PUCCH resource is determined based on the PUCCH resource for a dynamically scheduled HARQ-ACK feedback by:

selecting a first target PUCCH resource having the same resource number as the fourth PUCCH resource from PUCCH resources for the dynamically scheduled HARQ-ACK feedback, and determining the repetition factor of the fourth PUCCH based on a repetition factor of a first target PUCCH corresponding to the first target PUCCH resource; or selecting, in case that the semi-static UCI is channel situation information (CSI), a second target PUCCH resource having the same coding rate as the fourth PUCCH resource from PUCCH resources for the dynamically scheduled HARQ-ACK feedback, and determining the repetition factor of the fourth PUCCH based on a repetition factor of a second target PUCCH corresponding to the second target PUCCH resource; or selecting, in case that the semi-static UCI is scheduling request (SR), a third target PUCCH resource having the same PUCCH format and number of symbols occupied by the PUCCH format as the fourth PUCCH resource from PUCCH resources for the dynamically scheduled HARQ-ACK feedback, and determining the repetition factor of the fourth PUCCH based on repetition factor of a third target PUCCH corresponding to the third target PUCCH resource; or determining, in case that the semi-static UCI is an HARQ-ACK feedback corresponding to a semi-persistent scheduling (SPS) physical downlink shared channel (PDSCH), the repetition factor of the fourth PUCCH based on PUCCH repetition factors corresponding to status values of the PRI field in the target DCI, where the target DCI is a DCI activating the SPS.

In an embodiment, in case that the number of the above-mentioned target PUCCH resources is at least two, the maximum value, the minimum value or an average value among repetition factors corresponding to all the target PUCCH resources is determined as the repetition factor of the fourth PUCCH;

the target PUCCH resource is the first target PUCCH resource, the second target PUCCH resource or the third target PUCCH resource.

In an embodiment, in case that the target information is the MAC CE, the target information is transmitted to the UE by:

for a fifth PUCCH carrying UCI, transmitting the MAC CE to the UE, where the MAC CE includes one or more repetition factor indication fields, and each repetition factor indication field is used for indicating a repetition factor corresponding to a PUCCH resource or a group of PUCCH resources; and the UE determines, in case that the MAC CE takes effect, a repetition factor of the fifth PUCCH based on one or more repetition factor indication fields in the MAC CE.

In an embodiment, time of taking effect of the MAC CE is time after the UE transmits the HARQ-ACK feedback to the base station after receiving the MAC CE and the base station receives the HARQ-ACK feedback.

In an embodiment, in case that the MAC CE does not take effect, the repetition factor of the fifth PUCCH is determined to be a preset value or a repetition factor configured by the RRC.

In an embodiment, in case that the target information is control information carried by the group common PDCCH, the target information is transmitted to the UE by:

for a sixth PUCCH carrying UCI, periodically transmitting the group common PDCCH to the UE, where the group common PDCCH is scrambled by a radio network temporary identity (RNTI) to indicate that the group common PDCCH is used for notifying a PUCCH repetition factor, the group common PDCCH includes one or more information fields, each information field contains R bits, and each of $2^R$ status values composed of R bits corresponds to a PUCCH repetition factor; and then the UE obtains an information field corresponding to itself from the one or more information fields, and determines a repetition factor of the sixth PUCCH based on status value of the information field;

R is a positive integer greater than or equal to 1.

In an embodiment, each of the one or more information fields is configured with one PUCCH repetition factor for a group of UE on one carrier; or each of the one or more information fields is configured with a UE-specific PUCCH repetition factor for UE.

In an embodiment, in case that packet loss occurs on the group common PDCCH, the repetition factor of the sixth PUCCH is any one of the following items:

a PUCCH repetition factor indicated by a previous group common PDCCH, a default PUCCH repetition factor or a PUCCH repetition factor configured by RRC.

In an embodiment, a bit switch is configured in RRC to indicate the UE to determine the PUCCH repetition factor based on the PRI field in the received DCI; or a bit switch is newly added to the DCI to indicate the UE to determine the PUCCH repetition factor based on the PRI field in the received DCI.

Figure 8:
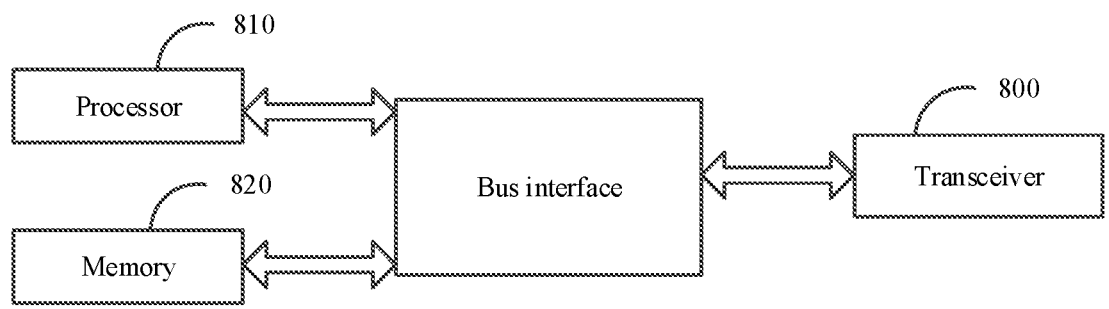
FIG. 8 is a schematic structural diagram of UE according to an embodiment of the present application.

FIG. 8 is a schematic structural diagram of user equipment (UE) according to an embodiment of the present application, and the UE includes a memory 820, a transceiver 800, and a processor 810.

In FIG. 8, a bus architecture may include any number of interconnected buses and bridges, which are linked together through various circuits of one or more processors represented by processor 810 and one or more memories represented by the memory 820. The bus architecture can also link together various other circuits, such as peripherals, voltage regulators, and power management circuits. The bus interface provides an interface. Transceiver 800 may include multiple elements, i.e., include a transmitter and a receiver, devices for providing communication with various other devices over transmission media including wireless channels, wired channels, fiber optic cables, and the like. The processor 810 is responsible for managing the bus architecture and general processing, and the memory 820 can store data used by the processor 810 when performing operations.

The processor 810 may be a central processing unit (CPU), an application specific integrated circuit (ASIC), a field-programmable gate array (FPGA), or a complex programmable logic device (CPLD), the processor can also use a multi-core architecture.

The memory 820 is configured to store a computer program; the transceiver 800 is configured to send and receive data under the control of the processor; the processor 810 is configured to read the computer program in the memory and perform the following operations:

determining a physical uplink control channel (PUCCH) repetition factor based on received target information; where the target information includes first information or second information, the first information includes a PUCCH resource indication (PRI) field in downlink control information (DCI), and the second information includes a given field in DCI, a medium access control layer control element (MAC CE) or control information carried by a group common physical downlink control channel (PDCCH). For example, the given field may be a newly added field.

In an embodiment, in case that the target information is the PRI field in DCI, the determining the PUCCH repetition factor based on received target information includes:

determining a first PUCCH resource for a dynamically scheduled hybrid automatic repeat request-acknowledge (HARQ-ACK) feedback based on a status value of the PRI field in DCI, and determining a repetition factor of a first PUCCH corresponding to the first PUCCH resource based on a received higher layer signaling, where the first PUCCH is a PUCCH carrying the dynamically scheduled HARQ-ACK feedback and the higher layer signaling is configured with the repetition factor of the first PUCCH corresponding to the first PUCCH resource; or determining a second PUCCH resource for a dynamically scheduled HARQ-ACK feedback based on a status value of the PRI field in DCI, and determining a repetition factor of a second PUCCH corresponding to the second PUCCH resource based on pre-obtained correspondence between status values of the PRI field and PUCCH repetition factors, where the second PUCCH is a PUCCH carrying the dynamically scheduled HARQ-ACK feedback.

In an embodiment, the correspondence between the status values of the PRI field and the PUCCH repetition factors is pre-agreed by the UE and a base station through a protocol; or the correspondence between the status values of the PRI field and the PUCCH repetition factors is pre-configured through a target signaling, where the target signaling includes a higher layer signaling, a MAC CE or a physical layer signaling.

In an embodiment, a newly added field is included in the DCI, and the newly added field includes N bits or M bits. Each of $2^N$ status values composed of the N bits corresponds to a PUCCH repetition factor, and each of $2^M$ status values composed of the M bits corresponds to a scaling factor value;

in case that the target information is the DCI, the determining the PUCCH repetition factor based on received target information includes:

determining a third PUCCH resource for dynamically scheduled HARQ-ACK feedback based on the status values of the PRI field in the DCI; determining, in case that the newly added field in the DCI includes N bits, a PUCCH repetition factor corresponding to the newly added field as repetition factor of a third PUCCH corresponding to the third PUCCH resource, where the third PUCCH is a PUCCH carrying the dynamically scheduled HARQ-ACK feedback; and scaling, in case that the newly added field includes M bits, a semi-static PUCCH repetition factor configured by radio resource control (RRC) based on the scaling factor value corresponding to the newly added field, to obtain the repetition factor of the third PUCCH; both N and M are integers greater than or equal to 0, and the scaling factor value is a number greater than or equal to 0.

In an embodiment, in case that the third PUCCH resource corresponds to multiple DCI, repetition factors of the third PUCCH determined based on the newly added field in each of the multiple DCI are the same. In one embodiment, in case that the third PUCCH resource corresponds to multiple DCI and repetition factors of the third PUCCH determined based on the newly added field in each DCI are different, the repetition factor of the third PUCCH is determined based on lastly received DCI, or a maximum value, or a minimum value or an average value among PUCCH repetition factors determined based on all the multiple DCI is determined as the repetition factor of the third PUCCH.

In an embodiment, for the semi-static uplink channel information (UCI), obtaining a fourth PUCCH resource configured through higher layer signaling, and determining a repetition factor of a fourth PUCCH corresponding to the fourth PUCCH resource based on the PUCCH resource for the dynamically scheduled HARQ-ACK feedback, where the fourth PUCCH is a PUCCH carrying the semi-static UCI, and the PUCCH resource for the dynamically scheduled HARQ-ACK feedback is the second PUCCH resource or the third PUCCH resource.

In an embodiment, the determining the repetition factor of the fourth PUCCH corresponding to the fourth PUCCH resource based on the PUCCH resource for the dynamically scheduled HARQ-ACK feedback includes:

selecting a first target PUCCH resource having the same resource number as the fourth PUCCH resource from PUCCH resources for the dynamically scheduled HARQ-ACK feedback, and determining the repetition factor of the fourth PUCCH based on a repetition factor of a first target PUCCH corresponding to the first target PUCCH resource; or selecting, in case that the semi-static UCI is channel situation information (CSI), a second target PUCCH resource having the same coding rate as the fourth PUCCH resource from PUCCH resources for the dynamically scheduled HARQ-ACK feedback, and determining the repetition factor of the fourth PUCCH based on a repetition factor of a second target PUCCH corresponding to the second target PUCCH resource; or selecting, in case that the semi-static UCI is scheduling request (SR), a third target PUCCH resource having the same PUCCH format and number of symbols occupied by the PUCCH format as the fourth PUCCH resource from PUCCH resources for the dynamically scheduled HARQ-ACK feedback, and determining the repetition factor of the fourth PUCCH based on a repetition factor of a third target PUCCH corresponding to the third target PUCCH resource; or determining, in case that the semi-static UCI is an HARQ-ACK feedback corresponding to a semi-persistent scheduling (SPS) physical downlink shared channel (PDSCH), the repetition factor of the fourth PUCCH based on PUCCH repetition factors corresponding to status values of the PRI field in the target DCI, where the target DCI is a DCI activating the SPS.

In an embodiment, in case that the number of the target PUCCH resources is at least two, a maximum value, a minimum value or an average value among repetition factors corresponding to all the target PUCCH resources is determined as the repetition factor of the fourth PUCCH and the target PUCCH resource is the first target PUCCH resource, the second target PUCCH resource or the third target PUCCH resource.

In an embodiment, in case that the target information is the MAC CE, the determining the PUCCH repetition factor based on received target information includes:

for a fifth PUCCH carrying the UCI, receiving the MAC CE transmitted by the base station, where the MAC CE includes one or more repetition factor indication fields, and each repetition factor indication field is used for indicating a repetition factor corresponding to a PUCCH resource or a group of PUCCH resources; determining, in case that the MAC CE takes effect, a repetition factor of the fifth PUCCH based on one or more repetition factor indication field in the MAC CE; where time of taking effect of the MAC CE is time after the UE transmits the HARQ-ACK feedback to the base station after receiving the MAC CE and the base station receives the HARQ-ACK feedback.

In an embodiment, in case that the MAC CE does not take effect, determining the repetition factor of the fifth PUCCH to be a preset value or a repetition factor configured by the RRC.

In an embodiment, in case that the target information is control information carried by the group common PDCCH, the determining the PUCCH repetition factor based on received target information includes:

receiving, for a sixth PUCCH carrying UCI, group common PDCCH periodically transmitted by the base station where the group common PDCCH is scrambled by a radio network temporary identity (RNTI) to indicate that the group common PDCCH is used for notifying a PUCCH repetition factor; the group common PDCCH includes one or more information field, each information field contains R bits, and each of $2^R$ status values composed of R bits corresponds to a PUCCH repetition factor, and R is a positive integer greater than or equal to 1; and then UE obtains an information field corresponding to itself from the one or more information fields, and determines the repetition factor of the sixth PUCCH based on the status value of the information field.

In an embodiment, each of the one or more information fields is configured with one PUCCH repetition factor for a group of UE on a carrier; or, each of the one or more information fields is configured with a UE-specific PUCCH repetition factor for UE.

In an embodiment, in case that packet loss occurs on the group common PDCCH, the repetition factor of the sixth PUCCH is any one of the following items: a PUCCH repetition factor indicated by a previous group common PDCCH, a default PUCCH repetition factor or a PUCCH repetition factor configured by RRC.

In an embodiment, the processor 810 is further used for:
determining, in case that a bit switch configured by RRC indicates that PUCCH repetition factor is determined by PRI field, the PUCCH repetition factor based on the PRI field in the received DCI; or determining, in case that a newly added bit switch in the DCI indicates that PUCCH repetition factor is determined by PRI field, the PUCCH repetition factor based on the PRI field in the received DCI.

The UE according to the present embodiment can perform all the method steps that can be implemented by the above-mentioned UE-side method embodiments, and can provide the same effect, which is not repeated.

Figure 9:
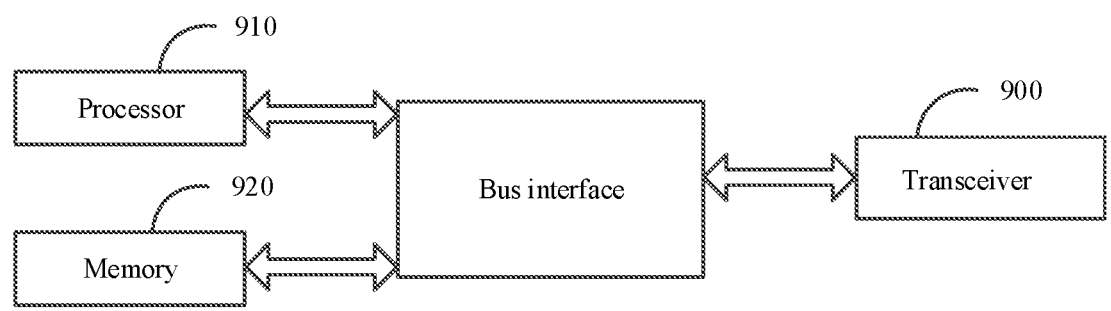
FIG. 9 is a schematic structural diagram of a base station according to an embodiment of the present application.

FIG. 9 is a schematic structural diagram of a base station according to an embodiment of the present application, and the base station includes a memory 920, a transceiver 900, and a processor 910.

In FIG. 9, a bus architecture may include any number of interconnected buses and bridges, which are linked together through various circuits of one or more processors represented by processor 910 and one or more memories represented by the memory 920. The bus architecture can also link together various other circuits, such as peripherals, voltage regulators, and power management circuits. The bus interface provides an interface. Transceiver 900 may include multiple elements, i.e., include a transmitter and a receiver, devices for providing communication with various other devices over transmission media including wireless channels, wired channels, fiber optic cables, and the like. The processor 910 is responsible for managing the bus architecture and general processing, and the memory 920 can store data used by the processor 910 when performing operations.

The processor 910 may be a central processing unit (CPU), an application specific integrated circuit (ASIC), a field-programmable gate array (FPGA), or a complex programmable logic device (CPLD), the processor can also use a multi-core architecture.

The memory 920 is configured to store a computer program; the transceiver 900 is configured to send and receive data under the control of the processor; the processor 910 is configured to read the computer program in the memory and perform the following operations:

transmitting target information to user equipment (UE), where the target information is used for enabling the UE to determine a physical uplink control channel (PUCCH) repetition factor;

where the target information includes first information or second information, the first information includes a PUCCH resource indication (PRI) field in downlink control information (DCI), and the second information includes a given field in DCI, a medium access control layer control element (MAC CE) or control information carried by a group common physical downlink control channel (PDCCH). For example, the given field may be a newly added field.

In an embodiment, in case that the target information is the PRI field in the DCI, the processor 910 is further used for:

transmitting higher layer signaling to the UE, where the higher layer signaling is configured with a repetition factor of a first PUCCH corresponding to a first PUCCH resource, where the first PUCCH resource is a PUCCH resource indicated by a status value of the PRI field in the DCI, and the first PUCCH is a PUCCH carrying dynamically scheduled hybrid automatic repeat request-acknowledge (HARQ-ACK) feedback; or determine a repetition factor of a second PUCCH corresponding to a second PUCCH resource based on pre-obtained correspondence between the status values of the PRI field and the PUCCH repetition factors, where the second PUCCH resource is a PUCCH resource indicated by a status value of the PRI field in the DCI, and the second PUCCH is a PUCCH carrying the dynamically scheduled HARQ-ACK feedback.

In an embodiment, the correspondence between the status values of PRI field and PUCCH repetition factors is pre-agreed by the UE and the base station through a protocol; or, the correspondence between the status values of the PRI field and the PUCCH repetition factors is transmitted to the UE by target signaling, where the target signaling includes higher layer signaling, MAC CE or physical layer signaling.

In an embodiment, a newly added field is included in the DCI, and the newly added field includes N bits or M bits. Each of $2^N$ status values composed of the N bits corresponds to a PUCCH repetition factor, and each of $2^M$ status values composed of the M bits corresponds to a scaling factor value.

In an embodiment, in case that the target information is the DCI, the processor 910 is further used for:
configuring, in case that a newly added field in the DCI includes N bits, a PUCCH repetition factor corresponding to the newly added field to indicate a repetition factor of a third PUCCH corresponding to a third PUCCH resource, where the third PUCCH resource is a PUCCH resource indicated by a status value of the PRI field in the DCI and the third PUCCH is a PUCCH carrying the dynamically scheduled HARQ-ACK feedback; configuring, in case that the newly added field includes M bits, a scaling factor value corresponding to the newly added field to indicate the repetition factor of the third PUCCH; both N and M are integers greater than or equal to 0, and the scaling factor value is a number greater than or equal to 0.

In an embodiment, in case that the third PUCCH resource corresponds to multiple DCI, repetition factors of the third PUCCH determined based on the newly added field in each of the multiple DCI are the same. In one embodiment, in case that the third PUCCH resource corresponds to multiple DCI and repetition factors of the third PUCCH determined based on the newly added field in each DCI are different, the repetition factor of the third PUCCH is determined based on the lastly transmitted DCI, or a maximum value, or a minimum value or an average value among PUCCH repetition factors determined based on all the multiple DCI is determined as the repetition factor of the third PUCCH.

In an embodiment, for the semi-static uplink channel information (UCI), a fourth PUCCH resource is configured through higher layer signaling, and a repetition factor of a fourth PUCCH corresponding to the fourth PUCCH resource is determined based on the PUCCH resource for the dynamically scheduled HARQ-ACK feedback, where the fourth PUCCH is a PUCCH carrying the semi-static UCI, and the PUCCH resource for the dynamically scheduled HARQ-ACK feedback is the second PUCCH resource or the third PUCCH resource.

In an embodiment, the repetition factor of the fourth PUCCH corresponding to the fourth PUCCH resource is determined based on the PUCCH resource for the dynamically scheduled HARQ-ACK feedback by:
selecting a first target PUCCH resource having the same resource number as the fourth PUCCH resource from PUCCH resources for the dynamically scheduled HARQ-ACK feedback, and determining the repetition factor of the fourth PUCCH based on a repetition factor of a first target PUCCH corresponding to the first target PUCCH resource; or selecting, in case that the semi-static UCI is channel situation information (CSI), a second target PUCCH resource having the same coding rate as the fourth PUCCH resource from PUCCH resources for the dynamically scheduled HARQ-ACK feedback, and determining the repetition factor of the fourth PUCCH based on a repetition factor of a second target PUCCH corresponding to the second target PUCCH resource; or selecting, in case that the semi-static UCI is scheduling request (SR), a third target PUCCH resource having the same PUCCH format and number of symbols occupied by the PUCCH format as the fourth PUCCH resource from PUCCH resources for the dynamically scheduled HARQ-ACK feedback, and determining the repetition factor of the fourth PUCCH based on a repetition factor of a third target PUCCH corresponding to the third target PUCCH resource; or determining, in case that the semi-static UCI is an HARQ-ACK feedback corresponding to a semi-persistent scheduling (SPS) physical downlink shared channel (PDSCH), the repetition factor of the fourth PUCCH based on PUCCH repetition factors corresponding to status values of the PRI field in the target DCI, where the target DCI is a DCI activating the SPS.

In an embodiment, in case that the number of the target PUCCH resources is at least two, a maximum value, a minimum value or an average value among repetition factors corresponding to all the target PUCCH resources is determined as the repetition factor of the fourth PUCCH and the target PUCCH resource is the first target PUCCH resource, the second target PUCCH resource or the third target PUCCH resource.

In an embodiment, in case that the target information is the MAC CE, the target information is transmitted to the UE by:
for a fifth PUCCH carrying UCI, transmitting the MAC CE to the UE, where the MAC CE includes one or more repetition factor indication fields, and each repetition factor indication field is used for indicating a repetition factor corresponding to a PUCCH resource or a group of PUCCH resources; and the UE determines, in case that the MAC CE takes effect, a repetition factor of the fifth PUCCH based on one or more repetition factor indication fields in the MAC CE; where time of taking effect of the MAC CE is time after the UE transmits the HARQ-ACK feedback to the base station after receiving the MAC CE and the base station receives the HARQ-ACK feedback.

In an embodiment, in case that the MAC CE does not take effect, the repetition factor of the fifth PUCCH is determined to be a preset value or a repetition factor configured by the RRC.

In an embodiment, in case that the target information is control information carried by the group common PDCCH, the target information is transmitted to the UE by:
for a sixth PUCCH carrying UCI, periodically transmitting the group common PDCCH to the UE, where the group common PDCCH is scrambled by a radio network temporary identity (RNTI) to indicate that the group common PDCCH is used for notifying a PUCCH repetition factor, the group common PDCCH includes one or more information fields, each information field contains R bits, and each of $2^R$ status values composed of R bits corresponds to a PUCCH repetition factor; and then the UE obtains an information field corresponding to itself from the one or more information fields, and determines a repetition factor of the sixth PUCCH based on status value of the information field; R is a positive integer greater than or equal to 1.

In an embodiment, each of the one or more information fields is configured with one PUCCH repetition factor for a group of UE on a carrier; or, each of the one or more information fields is configured with a UE-specific PUCCH repetition factor for UE.

In an embodiment, in case that packet loss occurs on the group common PDCCH, the repetition factor of the sixth PUCCH is any one of the following items: a PUCCH repetition factor indicated by a previous group common PDCCH, a default PUCCH repetition factor or a PUCCH repetition factor configured by RRC.

In the present embodiment, a bit switch is configured in RRC to indicate the UE to determine the PUCCH repetition factor based on the PRI field in the received DCI; or a bit switch is added to the DCI to indicate the UE to determine the PUCCH repetition factor based on the PRI field in the received DCI.

The base station according to the present embodiment can perform all the method steps that can be implemented by the above-mentioned base station-side method embodiments, and can provide the same effect, which is not repeated.

It should be noted that, the division of devices in the embodiments of the present application is schematic, and is only a logical function division, and there may be other division manners in actual implementation. In addition, the functional devices in the various embodiments of the present application may be integrated into one processing device, or each device may exist alone physically, or two or more devices may be integrated into one device. The above-mentioned integrated device can be implemented in the form of hardware or software functional unit.

If the integrated device is implemented in the form of a software functional device and sold or used as an independent product, it can be stored in a computer readable storage medium. Based on such understanding, the solutions of the present application in essence or a part of the solutions that contributes to the prior art, or all or part of the solutions, may be embodied in the form of a software product, which is stored in a storage medium, including several instructions to cause a computer device (which may be a personal computer, server, or network side device, etc.) or a processor to perform all or part of the steps of the methods described in the respective embodiments of the present application. The storage medium described above includes various media that can store program codes such as USB flash disk, mobile hard disk, read-only memory (ROM), random access memory (RAM), magnetic disk, or a compact disk.

It should be noted here that the above-mentioned devices according to the embodiments of the present application can implement all the method steps implemented by the above-mentioned method embodiments, and can achieve the same effect. The same parts and beneficial effects as the same method embodiments are not repeated.

An embodiment of the present application provides a non-transitory computer readable storage medium having stored thereon a computer program that cause a processor to perform the steps of the methods described above.

The computer readable storage medium can be any available medium or data storage device that can be accessed by the computer, including but not limited to, a magnetic storage (e.g., a floppy disk, a hard disk, a magnetic tape, a magneto-optical disk (MO), etc.), optical memory (such as CD, DVD, BD, HVD, etc.), and a semiconductor memory (such as ROM, EPROM, EEPROM, non-volatile memory (NAND FLASH), solid-state drive (SSD)), etc.

From the foregoing embodiments that a computer-readable storage medium stores a computer program, and the computer program is used for causing the processor to perform the methods described in the foregoing embodiments.

Embodiments of the present application may be provided as a method, system, or computer program product. Accordingly, the present application may take the form of an entirely hardware embodiment, an entirely software embodiment, or an embodiment combining software and hardware aspects. Furthermore, the present application may take the form of a computer program product embodied on one or more computer-usable storage media having computer-usable program code embodied therein, including but not limited to disk storage, optical storage, and the like.

The present application is described with reference to flow charts and/or block diagrams of methods, apparatus (systems), and computer program products according to embodiments of the present application. It will be understood that each flow and/or block in the flow charts and/or block diagrams, and combinations thereof can be implemented by computer-executable instructions. These computer-executable instructions may be provided to processors of a general purpose computer, a special purpose computer, an embedded processor or other programmable data processing device to produce a machine and the instructions executed by the processor of the computer or other programmable data processing device form a means for performing the functions specified in one or more flows in a flowchart and/or one or more blocks of a block diagram.

These computer-executable instructions may be stored in a computer-readable memory for directing a computer or other programmable data processing apparatus to operate in a particular manner, and the instructions stored in the computer-readable memory may result in a manufacture including instruction means, the instruction means can perform the functions specified in one or more flows of the flowchart and/or one or more blocks of the block diagram.

These computer-executable instructions can also be loaded onto a computer or other programmable data processing device to cause a series of operational steps to be performed on the computer or other programmable device to produce a computer-implemented process and instructions performed on the computer or other programmable devices provide steps for performing the functions specified in one or more flows of the flowchart and/or one or more blocks of the block diagram.

What is claimed is:

1. A method for determining a physical uplink control channel (PUCCH) repetition factor, comprising:
   determining a PUCCH repetition factor based on received target information;
   wherein the target information comprises first information or second information, the first information comprises a PUCCH resource indication (PRI) field in downlink control information (DCI), and the second information comprises a given field in DCI, a medium access control layer control element (MAC CE) or control information carried by a group common physical downlink control channel (PDCCH);
   wherein in case that the target information is control information carried by the group common PDCCH, the determining the PUCCH repetition factor based on received target information comprises:

receiving, for a sixth PUCCH carrying UCI, a group common PDCCH periodically transmitted by a base station, wherein the group common PDCCH is scrambled by a radio network temporary identity (RNTI) to indicate that the group common PDCCH is used for notifying a PUCCH repetition factor, wherein the group common PDCCH comprises one or more information fields, each information field contains R bits, and each of $2^R$ status values composed of R bits corresponds to a PUCCH repetition factor, and R is a positive integer greater than or equal to 1; and obtaining, by UE, an information field corresponding to the UE from the one or more information fields, and determining a repetition factor of the sixth PUCCH based on a status value of the information field;

wherein each of the one or more information fields is configured with a PUCCH repetition factor for a group of UE on a carrier; or each of the one or more information fields is configured with a UE-specific PUCCH repetition factor for UE;

wherein in case that packet loss occurs on the group common PDCCH, the repetition factor of the sixth PUCCH is any one of the following items: a PUCCH repetition factor indicated by a previous group common PDCCH, a default PUCCH repetition factor or a PUCCH repetition factor configured by RRC.

2. The method of claim 1, wherein in case that the target information is the PRI field in DCI, the determining the PUCCH repetition factor based on received target information comprises:

determining a first PUCCH resource for a dynamically scheduled hybrid automatic repeat request-acknowledge (HARQ-ACK) feedback based on a status value of the PRI field in DCI, and determining a repetition factor of a first PUCCH corresponding to the first PUCCH resource based on a received higher layer signaling, wherein the first PUCCH is a PUCCH carrying the dynamically scheduled HARQ-ACK feedback and the higher layer signaling is configured with the repetition factor of the first PUCCH corresponding to the first PUCCH resource; or determining a second PUCCH resource for a dynamically scheduled HARQ-ACK feedback based on a status value of the PRI field in DCI, and determining a repetition factor of a second PUCCH corresponding to the second PUCCH resource based on pre-obtained correspondence between status values of the PRI field and PUCCH repetition factors, wherein the second PUCCH is a PUCCH carrying the dynamically scheduled HARQ-ACK feedback;

the method further comprising: determining, in case that a bit switch configured by RRC indicates that PUCCH repetition factor is determined by PRI field, the PUCCH repetition factor based on the PRI field in received DCI; or determining, in case that a bit switch in DCI indicates that PUCCH repetition factor is determined by PRI field, the PUCCH repetition factor based on the PRI field in received DCI;

wherein the correspondence between the status values of the PRI field and the PUCCH repetition factors is pre-agreed by user equipment (UE) and a base station through a protocol; or the correspondence between the status values of the PRI field and the PUCCH repetition factors is pre-configured through a target signaling, wherein the target signaling comprises a higher layer signaling, a MAC CE or a physical layer signaling.

3. The method of claim 1, wherein the given field in the DCI comprises N bits or M bits, each of $2^N$ status values composed of the N bits corresponds to a PUCCH repetition factor, and each of $2^M$ status values composed of the M bits corresponds to a scaling factor value;

in case that the target information is the given field in the DCI, the determining the PUCCH repetition factor based on received target information comprises:

determining a third PUCCH resource for dynamically scheduled HARQ-ACK feedback based on a status value of a PRI field in the DCI;

determining, in case that the given field in the DCI comprises N bits, a PUCCH repetition factor corresponding to the given field as a repetition factor of a third PUCCH corresponding to the third PUCCH resource, wherein the third PUCCH is a PUCCH carrying the dynamically scheduled HARQ-ACK feedback; and scaling, in case that the given field comprises M bits, a semi-static PUCCH repetition factor configured by a radio resource control (RRC) based on the scaling factor value corresponding to the given field, to obtain the repetition factor of the third PUCCH;

both N and M are integers greater than or equal to 0, and the scaling factor value is a number greater than or equal to 0;

wherein in case that the third PUCCH resource corresponds to multiple DCI, repetition factors of the third PUCCH determined based on the given field in each of the multiple DCI are the same; or in case that the third PUCCH resource corresponds to multiple DCI and repetition factors of the third PUCCH determined based on the given field in each DCI are different, the repetition factor of the third PUCCH is determined based on lastly received DCI, or a maximum value, or a minimum value or an average value among PUCCH repetition factors determined based on all the multiple DCI is determined as the repetition factor of the third PUCCH.

4. The method of claim 1, wherein in case that the target information is the MAC CE, the determining the PUCCH repetition factor based on received target information comprises:

receiving, for a fifth PUCCH carrying UCI, a MAC CE transmitted by a base station, wherein the MAC CE comprises one or more repetition factor indication fields, and each repetition factor indication field is used for indicating a repetition factor corresponding to a PUCCH resource or a group of PUCCH resources; and determining, in case that the MAC CE takes effect, a repetition factor of the fifth PUCCH based on one or more repetition factor indication fields in the MAC CE; and in case that the MAC CE does not take effect, determining the repetition factor of the fifth PUCCH to be a preset value or a repetition factor configured by the RRC;

wherein time of taking effect of the MAC CE is time after the UE transmits the HARQ-ACK feedback to a base station after receiving the MAC CE and the base station receives the HARQ-ACK feedback.

5. A method for determining a physical uplink control channel (PUCCH) repetition factor, comprising:

transmitting target information to user equipment (UE), wherein the target information is used for enabling the UE to determine a PUCCH repetition factor;

wherein the target information comprises first information or second information, the first information comprises a PUCCH resource indication (PRI) field in downlink control information (DCI), and the second information comprises a given field in DCI, a medium access control layer control element (MAC CE) or control information carried by a group common physical downlink control channel (PDCCH);

wherein in case that the target information is control information carried by the group common PDCCH, the transmitting target information to the UE comprises:

for a sixth PUCCH carrying UCI, periodically transmitting the group common PDCCH to the UE, wherein the group common PDCCH is scrambled by a radio network temporary identity (RNTI) to indicate that the group common PDCCH is used for notifying a PUCCH repetition factor, the group common PDCCH comprises one or more information fields, each information field contains R bits, and each of $2^R$ status values composed of R bits corresponds to a PUCCH repetition factor; and an information field corresponding to the UE is obtained by the UE from the one or more information fields and a repetition factor of the sixth PUCCH is determined based on a status value of the obtained information field by the UE;

R is a positive integer greater than or equal to 1;

wherein each of the one or more information fields is configured with a PUCCH repetition factor for a group of UE on a carrier; or each of the one or more information fields is configured with a UE-specific PUCCH repetition factor for UE;

wherein in case that packet loss occurs on the group common PDCCH, the repetition factor of the sixth PUCCH is any one of the following items: a PUCCH repetition factor indicated by a previous group common PDCCH, a default PUCCH repetition factor or a PUCCH repetition factor configured by RRC.

6. The method of claim 5, wherein in case that the target information is the PRI field in DCI, the method further comprises:

transmitting a higher layer signaling to the UE, wherein the higher layer signaling is configured with a repetition factor of a first PUCCH corresponding to a first PUCCH resource, wherein the first PUCCH resource is a PUCCH resource indicated by a status value of the PRI field in DCI, and the first PUCCH is a PUCCH carrying dynamically scheduled hybrid automatic repeat request-acknowledge (HARQ-ACK) feedback; or determining a repetition factor of a second PUCCH corresponding to a second PUCCH resource based on pre-obtained correspondence between status values of the PRI field and PUCCH repetition factors, wherein the second PUCCH resource is a PUCCH resource indicated by a status value of the PRI field in DCI, and the second PUCCH is a PUCCH carrying the dynamically scheduled HARQ-ACK feedback;

wherein a bit switch is configured in RRC to indicate the UE to determine the PUCCH repetition factor based on the PRI field in received DCI; or DCI comprises a bit switch to indicate the UE to determine the PUCCH repetition factor based on the PRI field in the received DCI;

wherein the correspondence between the status values of the PRI field and the PUCCH repetition factors is pre-agreed by the UE and a base station through a protocol; or the correspondence between the status values of the PRI field and the PUCCH repetition factors is transmitted to the UE through a target signaling, wherein the target signaling comprises a higher layer signaling, a MAC CE or a physical layer signaling.

7. The method of claim 5, wherein the given field in the DCI comprises N bits or M bits, each of $2^N$ status values composed of the N bits corresponds to a PUCCH repetition factor, and each of $2^M$ status values composed of the M bits corresponds to a scaling factor value;

in case that the target information is the given field in the DCI, the method further comprises:

configuring, in case that the given field in the DCI comprises N bits, a PUCCH repetition factor corresponding to the given field to indicate a repetition factor of a third PUCCH corresponding to a third PUCCH resource, wherein the third PUCCH resource is a PUCCH resource indicated by a status value of a PRI field in the DCI and the third PUCCH is a PUCCH carrying the dynamically scheduled HARQ-ACK feedback; or configuring, in case that the given field comprises M bits, a scaling factor value corresponding to the given field to indicate the repetition factor of the third PUCCH;

both N and M are integers greater than or equal to 0, and the scaling factor value is a number greater than or equal to 0;

wherein in case that the third PUCCH resource corresponds to multiple DCI, repetition factors of the third PUCCH determined based on the given field in each of the multiple DCI are the same; or in case that the third PUCCH resource corresponds to multiple DCI and repetition factors of the third PUCCH determined based on the given field in each DCI are different, the repetition factor of the third PUCCH is determined based on lastly transmitted DCI, or a maximum value, or a minimum value or an average value among PUCCH repetition factors determined based on all the multiple DCI is determined as the repetition factor of the third PUCCH.

8. The method of claim 5, wherein in case that the target information is the MAC CE, the transmitting target information to the UE comprises:

for a fifth PUCCH carrying UCI, transmitting the MAC CE to the UE, wherein the MAC CE comprises one or more repetition factor indication fields, and each repetition factor indication field is used for indicating a repetition factor corresponding to a PUCCH resource or a group of PUCCH resources; and in case that the MAC CE takes effect, a repetition factor of the fifth PUCCH is determined by the UE based on one or more repetition factor indication fields in the MAC CE; and in case that the MAC CE does not take effect, the repetition factor of the fifth PUCCH is determined to be a preset value or a repetition factor configured by the RRC;

wherein time of taking effect of the MAC CE is time after the UE transmits the HARQ-ACK feedback to the base station after receiving the MAC CE and the base station receives the HARQ-ACK feedback.

9. A user equipment (UE), comprising:
a processor,
a memory storing a computer program, and
a transceiver transmitting and receiving data under a control of the processor,
wherein the computer program, when executed by the processor, causes the processor to perform the method of claim 1.

10. The UE of claim 9, wherein in case that the target information is the PRI field in DCI, the determining the PUCCH repetition factor based on received target information comprises:
  determining a first PUCCH resource for a dynamically scheduled hybrid automatic repeat request-acknowledge (HARQ-ACK) feedback based on a status value of the PRI field in DCI, and determining a repetition factor of a first PUCCH corresponding to the first PUCCH resource based on a received higher layer signaling, wherein the first PUCCH is a PUCCH carrying the dynamically scheduled HARQ-ACK feedback and the higher layer signaling is configured with the repetition factor of the first PUCCH corresponding to the first PUCCH resource; or
  determining a second PUCCH resource for a dynamically scheduled HARQ-ACK feedback based on a status value of the PRI field in DCI, and determining a repetition factor of a second PUCCH corresponding to the second PUCCH resource based on pre-obtained correspondence between status values of the PRI field and PUCCH repetition factors, wherein the second PUCCH is a PUCCH carrying the dynamically scheduled HARQ-ACK feedback;
  the computer program further causes the processor to perform the following operations: determining, in case that a bit switch configured by RRC indicates that PUCCH repetition factor is determined by PRI field, the PUCCH repetition factor based on the PRI field in received DCI; or determining, in case that a bit switch in DCI indicates that PUCCH repetition factor is determined by PRI field, the PUCCH repetition factor based on the PRI field in received DCI;
  wherein the correspondence between the status values of the PRI field and the PUCCH repetition factors is pre-agreed by the UE and a base station through a protocol; or the correspondence between the status values of the PRI field and the PUCCH repetition factors is pre-configured through a target signaling, wherein the target signaling comprises a higher layer signaling, a MAC CE or a physical layer signaling.

11. The UE of claim 9, wherein the given field in the DCI comprises N bits or M bits, each of $2^N$ status values composed of the N bits corresponds to a PUCCH repetition factor, and each of $2^M$ status values composed of the M bits corresponds to a scaling factor value;
  in case that the target information is the given field in the DCI, the determining the PUCCH repetition factor based on received target information comprises:
  determining a third PUCCH resource for dynamically scheduled HARQ-ACK feedback based on a status value of a PRI field in the DCI;
  determining, in case that the given field in the DCI comprises N bits, a PUCCH repetition factor corresponding to the given field as a repetition factor of a third PUCCH corresponding to the third PUCCH resource, wherein the third PUCCH is a PUCCH carrying the dynamically scheduled HARQ-ACK feedback; and
  scaling, in case that the given field comprises M bits, a semi-static PUCCH repetition factor configured by a radio resource control (RRC) based on the scaling factor value corresponding to the given field, to obtain the repetition factor of the third PUCCH;
  both N and M are integers greater than or equal to 0, and the scaling factor value is a number greater than or equal to 0;
  wherein in case that the third PUCCH resource corresponds to multiple DCI, repetition factors of the third PUCCH determined based on the given field in each of the multiple DCI are the same; or
  in case that the third PUCCH resource corresponds to multiple DCI and repetition factors of the third PUCCH determined based on the given field in each DCI are different, the repetition factor of the third PUCCH is determined based on lastly received DCI, or a maximum value, or a minimum value or an average value among PUCCH repetition factors determined based on all the multiple DCI is determined as the repetition factor of the third PUCCH.

12. The UE of claim 9, wherein in case that the target information is the MAC CE, the determining the PUCCH repetition factor based on received target information comprises:
  receiving, for a fifth PUCCH carrying UCI, a MAC CE transmitted by a base station, wherein the MAC CE comprises one or more repetition factor indication fields, and each repetition factor indication field is used for indicating a repetition factor corresponding to a PUCCH resource or a group of PUCCH resources; and
  determining, in case that the MAC CE takes effect, a repetition factor of the fifth PUCCH based on one or more repetition factor indication fields in the MAC CE; and in case that the MAC CE does not take effect, determining the repetition factor of the fifth PUCCH to be a preset value or a repetition factor configured by the RRC;
  wherein time of taking effect of the MAC CE is time after the UE transmits the HARQ-ACK feedback to the base station after receiving the MAC CE and the base station receives the HARQ-ACK feedback.

13. A base station, comprising:
  a processor,
  a memory storing a computer program, and
  a transceiver transmitting and receiving data under a control of the processor,
  wherein the computer program, when executed by the processor, causes the processor to perform the following operations of:
  transmitting target information to user equipment (UE), wherein the target information is used for enabling the UE to determine a PUCCH repetition factor;
  wherein the target information comprises first information or second information, the first information comprises a PUCCH resource indication (PRI) field in downlink control information (DCI), and the second information comprises a given field in DCI, a medium access control layer control element (MAC CE) or control information carried by a group common physical downlink control channel (PDCCH);
  wherein in case that the target information is control information carried by the group common PDCCH, the transmitting target information to the UE comprises:
  for a sixth PUCCH carrying UCI, periodically transmitting the group common PDCCH to the UE, wherein the group common PDCCH is scrambled by a radio network temporary identity (RNTI) to indicate that the group common PDCCH is used for notifying a PUCCH repetition factor, the group common PDCCH comprises one or more information fields, each information field contains R bits, and each of $2^R$ status values composed of R bits corresponds to a PUCCH repetition factor; and an information field corresponding to the UE is obtained by the UE from the one or more information fields and a repetition factor of the sixth PUCCH is determined based on a status value of the obtained information field by the UE;

R is a positive integer greater than or equal to 1;

wherein each of the one or more information fields is configured with a PUCCH repetition factor for a group of UE on a carrier; or each of the one or more information fields is configured with a UE-specific PUCCH repetition factor for UE;

wherein in case that packet loss occurs on the group common PDCCH, the repetition factor of the sixth PUCCH is any one of the following items: a PUCCH repetition factor indicated by a previous group common PDCCH, a default PUCCH repetition factor or a PUCCH repetition factor configured by RRC.

14. The base station of claim 13, wherein in case that the target information is the PRI field in DCI, the computer program further causes the processor to perform the following operations:

transmitting a higher layer signaling to the UE, wherein the higher layer signaling is configured with a repetition factor of a first PUCCH corresponding to a first PUCCH resource, wherein the first PUCCH resource is a PUCCH resource indicated by a status value of the PRI field in DCI, and the first PUCCH is a PUCCH carrying dynamically scheduled hybrid automatic repeat request-acknowledge (HARQ-ACK) feedback; or determining a repetition factor of a second PUCCH corresponding to a second PUCCH resource based on pre-obtained correspondence between status values of the PRI field and PUCCH repetition factors, wherein the second PUCCH resource is a PUCCH resource indicated by a status value of the PRI field in DCI, and the second PUCCH is a PUCCH carrying the dynamically scheduled HARQ-ACK feedback;

wherein a bit switch is configured in RRC to indicate the UE to determine the PUCCH repetition factor based on the PRI field in received DCI; or DCI comprises a bit switch to indicate the UE to determine the PUCCH repetition factor based on the PRI field in the received DCI;

wherein the correspondence between the status values of the PRI field and the PUCCH repetition factors is pre-agreed by the UE and a base station through a protocol; or the correspondence between the status values of the PRI field and the PUCCH repetition factors is transmitted to the UE through a target signaling, wherein the target signaling comprises a higher layer signaling, a MAC CE or a physical layer signaling.

15. The base station of claim 13, wherein the given field in the DCI comprises N bits or M bits, each of $2^N$ status values composed of the N bits corresponds to a PUCCH repetition factor, and each of $2^M$ status values composed of the M bits corresponds to a scaling factor value;

in case that the target information is the given field in the DCI, the computer program further causes the processor to perform the operations:

configuring, in case that the given field in the DCI comprises N bits, a PUCCH repetition factor corresponding to the given field to indicate a repetition factor of a third PUCCH corresponding to a third PUCCH resource, wherein the third PUCCH resource is a PUCCH resource indicated by a status value of a PRI field in the DCI and the third PUCCH is a PUCCH carrying the dynamically scheduled HARQ-ACK feedback; or configuring, in case that the given field comprises M bits, a scaling factor value corresponding to the given field to indicate the repetition factor of the third PUCCH;

both N and M are integers greater than or equal to 0, and the scaling factor value is a number greater than or equal to 0;

wherein in case that the third PUCCH resource corresponds to multiple DCI, repetition factors of the third PUCCH determined based on the given field in each of the multiple DCI are the same; or in case that the third PUCCH resource corresponds to multiple DCI and repetition factors of the third PUCCH determined based on the given field in each DCI are different, the repetition factor of the third PUCCH is determined based on lastly transmitted DCI, or a maximum value, or a minimum value or an average value among PUCCH repetition factors determined based on all the multiple DCI is determined as the repetition factor of the third PUCCH.

16. The base station of claim 13, wherein in case that the target information is the MAC CE, the transmitting target information to the UE comprises:

for a fifth PUCCH carrying UCI, transmitting the MAC CE to the UE, wherein the MAC CE comprises one or more repetition factor indication fields, and each repetition factor indication field is used for indicating a repetition factor corresponding to a PUCCH resource or a group of PUCCH resources; and in case that the MAC CE takes effect, a repetition factor of the fifth PUCCH is determined by the UE based on one or more repetition factor indication fields in the MAC CE; and in case that the MAC CE does not take effect, the repetition factor of the fifth PUCCH is determined to be a preset value or a repetition factor configured by the RRC;

wherein time of taking effect of the MAC CE is time after the UE transmits the HARQ-ACK feedback to the base station after receiving the MAC CE and the base station receives the HARQ-ACK feedback.

* * * * *